United States Patent
Jiang

(10) Patent No.: US 9,422,385 B2
(45) Date of Patent: Aug. 23, 2016

(54) POLYETHYLENE COPOLYMERS WITH VINYL TERMINATED MACROMONOMERS AS COMONOMERS

(71) Applicant: ExxonMobil Chemical Patents Inc., Baytown, TX (US)

(72) Inventor: Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 245 days.

(21) Appl. No.: 14/157,932

(22) Filed: Jan. 17, 2014

(65) Prior Publication Data

US 2014/0213734 A1    Jul. 31, 2014

Related U.S. Application Data

(60) Provisional application No. 61/758,611, filed on Jan. 30, 2013.

(51) Int. Cl.
  *C08F 255/02* (2006.01)
  *C08F 290/04* (2006.01)
  *C08F 210/02* (2006.01)
  *C08F 210/16* (2006.01)

(52) U.S. Cl.
  CPC ........... *C08F 255/02* (2013.01); *C08F 290/042* (2013.01); *C08F 210/02* (2013.01); *C08F 210/16* (2013.01)

(58) Field of Classification Search
  CPC .... C08F 210/02; C08F 210/06; C08F 210/16; C08F 255/02; C08F 290/042; C08F 2/001; C08F 4/61927; C08F 4/63927; C08F 4/65927
  USPC ................ 526/65, 160, 170, 348; 525/53
  See application file for complete search history.

(56) References Cited

U.S. PATENT DOCUMENTS

| | | | |
|---|---|---|---|
| 4,704,491 A | 11/1987 | Tsutsui et al. | |
| 4,814,540 A | 3/1989 | Watanabe et al. | |
| 5,087,788 A | 2/1992 | Wu | |
| 5,164,454 A | 11/1992 | Suga et al. | |
| 5,616,153 A | 4/1997 | Mike et al. | |
| 5,688,887 A | 11/1997 | Bagheri et al. | |
| 6,043,401 A | 3/2000 | Bagheri et al. | |
| 6,100,224 A | 8/2000 | Peiffer et al. | |
| 6,111,027 A | 8/2000 | Wright et al. | |
| 6,117,962 A | 9/2000 | Weng et al. | |
| 6,133,209 A | 10/2000 | Rath et al. | |
| 6,414,090 B2 | 7/2002 | Minami et al. | |
| 6,414,091 B2 | 7/2002 | Moritoni et al. | |
| 6,548,724 B2 | 4/2003 | Bagheri et al. | |
| 6,555,635 B2 | 4/2003 | Markel et al. | |
| 6,706,828 B2 | 3/2004 | DiMaio et al. | |
| 6,713,438 B1 | 3/2004 | Baillargeon et al. | |
| 6,897,261 B1 * | 5/2005 | Machida | C08F 290/04 525/240 |
| 7,183,359 B2 | 2/2007 | Hanna et al. | |
| 7,223,822 B2 | 5/2007 | Abhari et al. | |
| 7,294,681 B2 | 11/2007 | Jiang et al. | |
| 7,951,873 B2 | 5/2011 | Best et al. | |
| 8,076,524 B2 | 12/2011 | Lattner et al. | |
| 2003/0055184 A1 | 3/2003 | Song et al. | |
| 2004/0127614 A1 | 7/2004 | Jiang et al. | |
| 2004/0214953 A1 * | 10/2004 | Yamada | C08L 23/06 525/240 |
| 2006/0217510 A1 * | 9/2006 | Kawashima | C08F 10/00 526/348.5 |
| 2009/0318644 A1 * | 12/2009 | Brant | C08F 210/06 526/170 |
| 2010/0152383 A1 * | 6/2010 | Jiang | C08L 23/06 525/53 |
| 2012/0245312 A1 | 9/2012 | Holtcamp et al. | |
| 2013/0029125 A1 | 1/2013 | Tse et al. | |

FOREIGN PATENT DOCUMENTS

| | | |
|---|---|---|
| EP | 0 613 873 | 9/1994 |
| JP | 2005-336092 | 12/2005 |
| WO | 94/07930 | 4/1994 |
| WO | 96/23751 | 8/1996 |
| WO | 2007/011459 | 1/2007 |

OTHER PUBLICATIONS

Garofalo et al., "Effect of Short-Chain Branching on Melt Fracture Behavior of Metallocene and Conventional Poly(Ethylene/ α-olefin) Copolymers", Polymer Engineering & AScience, vol. 52, No. 9, pp. 1968-1977 (2012).
Britovsek, George J. P. et al., "Novel olefin polymerization catalysts based on iron and cobalt", Chem. Comm., 1998, pp. 849-850.
Cherian, Anna E. et al., "Synthesis of Allyl-Terminated Syndiotactic Polypropylene: Macromonomers for the Synthesis of Branched Polyolefins", Macromolecules, 2005, 38, pp. 6259-6268.
Eshuis, J. J. W. et al. "Catalytic Olefin Oligomerization and Polymerization with Cationic Group IV Metal Complexes [Cp*2MMe(THT)]+{BPh4}-, M=Ti, Zr and Hf", Journal of Molecular Catalysis, 1990, 62, pp. 277-287.
Janiak, Christoph et al., "Metallocene Catalysts for Olefin Oligomerization", Macromol. Symp., 2006, 236, pp. 14-22.
Kaneyoshi, Hiromu et al., "Synthesis of Block and Graft Copolymers with Linear Polyethylene Segments by Combination of Degenerative Transfer Coordination Polymerization and Atom Transfer Radical Polymerization", Macromolecules, 2005, 38, pp. 5425-5435.
Kolodka, Edward et al., "Copolymerization of Propylene with Poly(ethylene-co-propylene) Macromonomer and Branch Chain-Length Dependence of Rheological Properties", Macromolecules, 2002, 35, pp. 10062-10070.
Kolodka, Edward et al., "Synthesis and Characterization of Long-Chain-Branched Polyolefins with Metallocene Catalysts: Copolymerization of Ethylene with Poly(ethylene-co-propylene) Macromonomer", Macromol. Rapid Commun , 2003, 24, pp. 311-315.

(Continued)

*Primary Examiner* — Roberto Rabago
(74) *Attorney, Agent, or Firm* — Kevin M. Faulkner; Catherine L. Bell

(57) ABSTRACT

This invention relates to polyethylene copolymers comprising ethylene and vinyl terminated macromonomers. The polyethylene copolymers are achieved by copolymerization of ethylene and vinyl terminated macromonomers in a polymerization reactor, particularly in high yields and with a wide range of VTM molecular weights, that can be made at commercial rates.

14 Claims, 1 Drawing Sheet

(56) References Cited

OTHER PUBLICATIONS

Markel, Eric J. et al., "Metallocene-Based Branch-Block Thermoplastic Elastomers", Macromolecules, 2000, 33, pp. 8541-8548.

Moscardi, Gilberto et al., "Propene Polymerization with the Isospecific, Highly Regioselective rac-Me2C(3-t-Bu-l-Ind)2ZrC12/MAO Catalyst. 2. Combined DFT/MM Analysis of Chain Propagation and Chain Release Reactions", Organometallics, 2001, 20, pp. 1918-1931.

Resconi, Luigi et al., "Olefin Polymerization at Bix(pentamethylcyclopentadienyl)zirconium and -hafnium Centers: Chain-Transfer Mechanisms", J. Am. Chem. Soc., 1992, 114, pp. 1025-1032.

Rose, Jeffrey M. et al., "Poly(ethylene-co-propylene macromonomer)s: Synthesis and Evidence for Starlike Conformations in Dilute Solution", Macromolecules, 2008, 41, pp. 559-567.

Rulhoff, et al., "Synthesis and Characterization of Defined Branched Poly(propylene)s with Different Microstructures by Copolymerization of Propylene and Linear Ethylene Oligomers (Cn=26-28) with Metallocenes/MAO Catalysts", Macromol. Chem. Phys., 2006, 207, pp. 1450-1460.

Schobel, Alexander, et al., "Polymerization Behavior of C1-Symmetric Metallocenes (M=Zr, Hf): From Ultrahigh Molecular Weight Elastic Polypropylene to Useful Macromonomers", Organometallics, vol. 32, No. 2, Jan. 28, 2013, pp. 427-437.

Small, Brooke L. et al., "Polymerization of Propylene by a New Generation of Iron Catalysts: Mechanisms of Chain Initiation, Propragation, and Termination", Macromolecules, 1999, 32, pp. 2120-2130.

Small, Brooke L. et al., "Highly Active Iron and Cobalt Catalysts for the Polymerization of Ethylene", J. Am. Chem. Soc., 1998, 120, pp. 4049-4050.

Sun, Wen-Hua et al., "Iron Complexes Bearing 2-Imino-1, 10-phenanthrolinyl Ligands as Highly Active Catalysts for Ethylene Oligomerization", Organometallics, 2006, 25, pp. 666-677.

Wasilke, Julia-Christina et al., "Concurrent Tandem Catalysis", Chem. Rev., 2005, 105, pp. 1001-1020.

Weng, Weiqing et al., "Synthesis of vinyl-terminated isotactic poly(propylene)", Macromol. Rapid Comm., 2000, 21, pp. 1103-1107.

Yang, Xinmim et al., "Cationic Metallocene Polymerization Catalysts, Synthesis and Properties of the First Base-Free Zirconocene Hydride", Agnew. Chem. Intl. Ed. Engl., 1992, 31, pp. 1375-1377.

* cited by examiner

POLYETHYLENE COPOLYMERS WITH VINYL TERMINATED MACROMONOMERS AS COMONOMERS

CROSS-REFERENCE TO RELATED APPLICATIONS

This application claims the benefit of Provisional Application No. 61/758,611, filed Jan. 30, 2013.

FIELD OF THE INVENTION

This invention relates to olefin polymerizations, particularly to produce polymers similar to linear low density polyethylene (LLDPE) and the like.

BACKGROUND OF THE INVENTION

Linear low density polyethylene (LLDPE) resins represent a very large and important segment of the polyethylene (PE) blown and cast film markets worldwide. These resins are synthesized by copolymerizing ethylene with an alpha-olefin comonomer such as 1-butene, 1-hexene or 1-octene. This results in an ethylene/alpha-olefin copolymer with many short chain branches (SCB) along the polymer backbone. The incorporation of 1-butene, 1-hexene or 1-octene comonomers results in ethyl (2 carbons), butyl (4 carbons) or hexyl (6 carbons) branches, respectively, along the polymer backbone.

Chain length of the short chain branches has significant effects on the end use properties and processability. The effects of branching on the properties of polyethylene depend on the length and the amount of the branches. Short chain branches (SCB), of less than approximately 40 carbon atoms, interfere with the formation of the crystal structure. Short branches mainly influence the mechanical and thermal properties. It was observed that differences in comonomer type have profound effects on the blown film properties. In general, film performance properties such as impact (toughness) and tear strengths increase with an increase in the comonomer length. Blown film performance is also greatly influenced by the comonomer composition distribution (CCD) (also often referred to as the short chain branch distribution (SCBD)) across the molecular weight distribution (MWD).

LLDPE can benefit from the addition of longer-chain comonomers. Many have been interested in modifying the architecture of such polyolefins in the hopes of obtaining new and better combinations of properties. One method of controlling polyolefin architecture is to select comonomers that will impart specific characteristics or tailoring the comonomers used. For example, several have tried to produce large "monomers" called "macromonomers" or "macromers" having amounts of vinyl, vinylidene or vinylene termination that can be polymerized with ethylene to impart longer chain branching, structural properties, etc. to a polyolefin. Typically, vinyl macromonomers are found more useful or easier to use than vinylene or vinylidene macromonomers. Examples of methods to produce various vinyl terminated macromonomers are disclosed in U.S. Pat. No. 6,117,962; U.S. Pat. No. 6,555,635; Small, Brookhart, Bennett, J Am Chem Soc 120, 1998, p. 4049; and Britovsek, et al. Chem. Comm. 1998, p. 849; Su, et al. Organomet., 25, 2006, p. 666. See also B. L. Small and M. Brookhart, "Polymerization of Propylene by a New Generation of Iron Catalysts: Mechanisms of Chain Initiation, Propagation, and Termination" Macromol., 32, 1999, p. 2322; "Metallocene-Based Branch-Block Thermoplastic Elastomers", E. J. Markel, W. Weng, A. J. Peacock, and A. H. Dekmezian, Macromol., 33, 2000, pp. 8541-8548; and A. E. Cherian, E. B. Lobkovski, and G. W. Coates, Macromol., 38, 2005, pp. 6259-6268.

Others have suggested in-situ variations where the macromonomer is produced in the same reactor where the polymerization occurs, such that the macromonomer is consumed as it is produced. Examples include U.S. Pat. Nos. 7,294,681 and 7,223,822, and U.S. Patent Application Publication No. US 2004/0127614, as well as tandem polymerization catalysts such as discussed by Bazan and coworkers (Chemical Rev, 2005, 105, pp. 1001-1020 and references therein). In many cases, long chain branched polyolefins can be produced in-situ under conditions that favor macromonomer production and its reincorporation in subsequently growing chains (See Chemical Rev, 2005, 105, pp. 1001-1020 and references therein).

Polyethylene formed through macromonomer reinsertion is often referred as to long chain branched (LCB) polyethylene since most of the macromonomers have a chain length longer than the critical entanglement chain length of a linear polymer chain. As the branch length increases, they are able to form lamellar crystals of their own. LCB has a tremendous effect on the melt rheological behavior. Even very small quantities of long-chain branching (LCB) alter the polymer processing properties significantly.

In other areas, low molecular weight macromonomers of larger monomers (often referred to as polyalphaolefins), such as octene, decene and dodecene, have been made for uses in lubricants and additives. For examples please see PCT Publication No. WO 2007/011459 A1 and U.S. Pat. No. 6,706,828. Others have made various polyalphaolefins, such as polydecene, using various metallocene catalysts not typically known to produce polymers or macromonomers with any specific tacticity. Examples include PCT Publication No. WO 96/23751, European Publication No. EP 0 613 873, U.S. Patent Application Publication No. US 2003/0055184, and U.S. Pat. Nos. 5,688,887; 6,043,401; 6,548,724; 5,087,788; 6,414,090; 6,414,091; 4,704,491; 6,133,209; and 6,713,438. Many of these polyalphaolefin molecules have terminal unsaturation that is typically hydrogenated or functionalized prior to use as a lubricant or fuel additive.

There is a gap in the spectrum with respect of comonomer chain length for LLDPE applications. Low molecular weight alpha olefins such as 1-butene, 1-hexene and 1-octene are typically used in LLDPE with SCB. The chain length of macromonomers used for LCB is typically longer than the entanglement chain length. Macromonomers with intermediate molecular weight have not been explored due to lack of availability in commercial scale. Commercially produced alpha-olefins are typically made by ethylene oligomerization. U.S. Pat. No. 8,076,524 discloses an oligomerization process for trimerization and/or tetramerization of C2 to C12 olefins, preferably alpha-olefins, preferably ethylene, using the ligand-metal-precursor combinations, metal-ligand complexes, and/or catalyst systems described herein in the unique processes for generating comonomer described herein. U.S. Patent Application Publication No. US 2009/0318644 discloses a process to make high vinyl terminated propylene based macromonomers. U.S. Patent Application Publication No. US 2012/0245312 discloses a catalyst system to produce vinyl terminated high olefin macromonomers. But no attempt has been made to use the macromonomers as a comonomer in polyethylene applications. LLDPE can benefit from the addition of longer-chain comonomers. Accordingly, there is a need for new products and processes that produce LLDPE with comonomers of intermediate molecular weight.

Allyl terminated low molecular weight solids and liquids of ethylene or propylene have also been produced, typically for use as branches in polymerization reactions. See, for example, Rulhoff, Sascha, and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts", Macromolecules, 16, 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mn's and do not have at least 93% allylic vinyl unsaturation. Likewise, these oligomers lack comonomer and are produced at low productivities with a large excess of alumoxane (molar ratio≥600 Al/M; M=Zr, Hf). Additionally, no less than 60 wt % solvent (solvent+propylene basis) is present in all of the examples.

Teuben et al. (J. Mol. Catal., 62, 1990, pp. 277-287) discloses the use of [Cp*$_2$MMe(THT)]+[BPh$_4$] (M=Zr and Hf; Cp*=pentamethylcyclopentadienyl; Me=methyl, Ph=phenyl; THT=tetrahydrothiophene), to make propylene macromonomers. For M=Zr, a broad product distribution with macromonomers up to $C_{24}$ (number average molecular weight (Mn) of 336) was obtained at room temperature. Whereas, for M=Hf, only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang et al. (Angew. Chem. Intl Ed. Engl., 31, 1992, pp. 1375-1377) disclose amorphous, low molecular weight polypropylene made at low temperatures where the reactions showed low activity and product having 90% allylic vinyls, relative to all unsaturations, by $^1$H NMR. Thereafter, Resconi et al. (J. Am. Chem. Soc., 114, 1992, pp. 1025-1032), discloses the use of bis(pentamethylcyclopentadienyl)zirconium and bis(pentamethylcyclopentadienyl)hafnium to polymerize propylene and obtained beta-methyl termination resulting in macromonomers and low molecular weight polymers with "mainly allyl- and iso-butyl-terminated" chains. As is the case in U.S. Pat. No. 4,814,540, the macromonomers produced do not have at least 93% allyl chain ends, an Mn of about 500 to about 20,000 g/mol (as measured by $^1$H NMR), and the catalyst has low productivity (1-12,620 g/mmol metallocene/hr; >3000 wppm Al in products).

Similarly, Small and Brookhart (Macromolecules, 32, 1999, pp. 2120-2130) disclose the use of a pyridylbisamido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm., 2000, 21, pp. 1103-1107) discloses materials with up to about 81 percent vinyl termination made using dimethylsilyl bis(2-methyl, 4-phenyl-indenyl) zirconium dichloride and methylalumoxane in toluene at about 120° C. The materials have a Mn of about 12,300 (measured with $^1$H NMR) and a melting point of about 143° C.

Macromolecules, 33, 2000, pp. 8541-8548 discloses preparation of branch-block ethylene-butene polymer by reincorporation of vinyl terminated polyethylene, said branch-block polymer made by a combination of $CP_2ZrCL_2$ and $(C_5Me_4SiMe_2NC_{12}H_{23})TiCl_2$ activated with methylalumoxane.

Moscardi et al. (Organometallics, 20, 2001, pp. 1918-1931) disclose the use of rac-dimethylsilylmethylenebis(3-t-butyl indenyl)zirconium dichloride with methylalumoxane in batch polymerizations of propylene to produce materials where " ... allyl end group always prevails over any other end groups, at any [propene]." In these reactions, morphology control was limited and approximately 60% of the chain ends are allylic.

Coates et al. (Macromolecules, 38, 2005, pp. 6259-6268) disclose preparation of low molecular weight syndiotactic polypropylene ([rrrr]=0.46-0.93) with about 100% allyl end groups using bis(phenoxyimine)titanium dichloride ((PHI)$_2$TiCl$_2$) activated with modified methyl alumoxane (MMAO; Al/Ti molar ratio=200) in batch polymerizations run between −20 and +20° C. for four hours. For these polymerizations, propylene was dissolved in toluene to create a 1.65 M toluene solution. Catalyst productivity was very low (0.95 to 1.14 g/mmol Ti/hr).

Japanese Publication No. JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers that do not have a significant amount of amorphous material.

Rose et al. (Macromolecules, 41, 2008, pp. 559-567) discloses poly(ethylene-co-propylene) macromonomers not having significant amounts of iso-butyl chain ends. Those were made with bis(phenoxyimine) titanium dichloride ((PHI)$_2$TiCl$_2$) activated with modified methylalumoxane (MMAO; Al/Ti molar ratio range 150 to 292) in semi-batch polymerizations (30 psi propylene added to toluene at 0° C. for 30 min, followed by ethylene gas flow at 32 psi of overpressure at about 0° C. for polymerization times of 2.3 to 4 hours to produce E-P copolymer having an Mn of about 4,800 to 23,300. In four reported copolymerizations, allylic chain ends decreased with increasing ethylene incorporation roughly according to the equation:

$$\% \text{ allylic chain ends(of total unsaturations)} = -0.95 \text{ (mol \% ethylene incorporated)} + 100.$$

For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from $0.78 \times 10^2$ g/mmol Ti/hr to $4.62 \times 10^2$ g/mmol Ti/hr. Prior to this work, Zhu et al. reported only low (~38%) vinyl terminated ethylene-propylene copolymer made with the constrained geometry metallocene catalyst [$C_5Me_4(SiMe_2N$-tert-butyl)TiMe$_2$ activated with $B(C_6F_5)_3$ and MMAO (Macromolecules, 35, 2002, pp. 10062-10070 and Macromolecules Rap. Commun., 24, 2003, pp. 311-315).

Janiak and Blank summarize a variety of work related to oligomerization of olefins (Macromol. Symp., 236, 2006, pp. 14-22).

Schobel, Lanzinger and Reiger in "*Polymerization Behavior of C1-Symmetric Metallocenes (M=Zr, Hf): From Ultrahigh Molecular Weight Elastic Polypropylene to Useful Macromonomers*" (OrganoMetallics, Jan. 15, 2013) discloses propylene macromonomers containing vinyl groups used to make polyethylene-g-polypropylene copolymers.

Additional references of interest include U.S. Pat. Nos. 6,111,027; 7,183,359; 6,100,224; and 5,616,153.

Accordingly, there remains a need for ethylene copolymers with improved properties.

SUMMARY OF THE INVENTION

This invention relates to an ethylene copolymer comprising at least 70 wt % of ethylene and at least one vinyl terminated macromonomer ("VTM") wherein the ethylene copolymer has a Mw of 100,000 g/mol or more; a density of 0.94 g/cm$^3$ or less; and a ratio of the complex viscosity at a frequency of 0.1 rad/s to the complex viscosity at a frequency of 100 rad/s is 15 or more and processes to make such ethylene copolymers comprising contacting ethylene and a VTM in the presence of at least one catalyst capable of incorporating the VTM into a polyethylene backbone.

DETAILED DESCRIPTION

Figure 1:
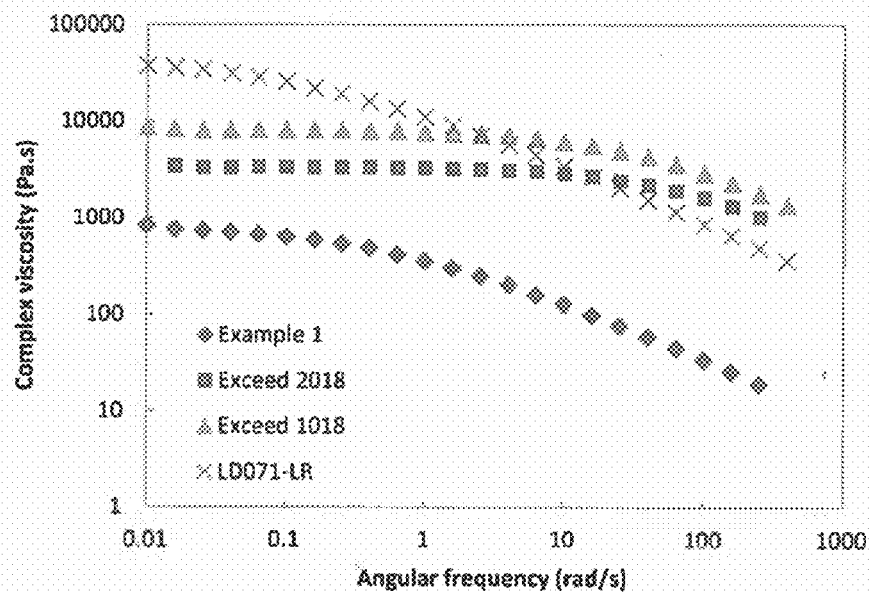
FIG. 1 provides a comparison of the shear thinning characteristics of the invented ethylene copolymer produced in Examples 1, Exceed™ 2018 polyethylene, Exceed™ 1018 polyethylene and LD071-LR™ low density polyethylene.

This invention relates to ethylene copolymers comprising ethylene and vinyl terminated macromonomers. The ethylene copolymers are achieved by copolymerization of ethylene and vinyl terminated macromonomers in a polymerization reactor. The invention also relates to a process for making such polymers. The process is conducted in one or two steps. For a two-step process, in the first step, a monomer or monomers are contacted with a suitable catalyst to produce a vinyl terminated macromonomer (VTM) with a high degree of terminal vinyl functionality. This VTM is then subjected to a second step wherein the copolymerization of the VTM with the same or another monomer(s) in the presence of a metallocene catalyst that provides the ultimate polymer.

This invention relates to ethylene copolymers comprising ethylene and vinyl terminated macromonomers, wherein said macromonomers has vinyl chain end of at least 50% relative to all unsaturated chain ends and a number average molecular weight measured by $^1$H NMR of 200 to 20,000 g/mol, wherein said ethylene copolymer has a shear thinning ratio of 15 or more and a density of 0.95 g/cm$^3$ or less.

DETAILED DESCRIPTION OF THE INVENTION DEFINITIONS

In the structures depicted throughout this specification and the claims, a solid line indicates a bond, and an arrow indicates that the bond may be dative.

As used herein, the new notation for the Periodic Table Groups is used as described in *Chemical and Engineering News*, 63(5), p. 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The invention relates to ethylene copolymers comprising units derived from a macromonomer with vinyl chain ends. The ethylene copolymers are achieved through copolymerization of ethylene and vinyl terminated macromonomers. An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin or a VTM, including, but not limited to, ethylene, propylene, and butene, the olefin or VTM present in such polymer or copolymer is the polymerized form of the olefin or VTM. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. Thus, as used herein, the terms "polyethylene," "ethylene polymer," "ethylene copolymer," and "ethylene based polymer" mean a polymer or copolymer comprising at least 50 mol % ethylene units (preferably at least 70 mol % ethylene units, more preferably at least 80 mol % ethylene units or 100 mol % ethylene units (in the case of a homopolymer)). A macromonomer is a polymer having a low molecular weight. In some embodiments, an macromonomer has an Mn of 21,000 g/mol or less (e.g., 2,500 g/mol or less); in other embodiments, an macromonomer has a low number of mer units (such as 75 mer units or less).

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

The terms "catalyst" and "catalyst compound" are defined to mean a compound capable of initiating catalysis. In the description herein, the catalyst may be described as a catalyst precursor, a pre-catalyst compound, or a transition metal compound (for example, a metallocene compound), and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

For purposes of this invention and the claims thereto, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). For these definitions, density is determined using the method described in the experimental below.

Polyethylene in an overlapping density range, i.e., 0.890 to 0.930 g/cm³, typically from 0.910 to 0.930 g/cm³, typically from 0.915 to 0.930 g/cm³, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no long chain branches, typically referred to as a g'$_{vis}$ of 0.97 or above, preferably 0.98 or above.

Composition Distribution Breadth Index (CDBI) is a measure of the composition distribution of monomer within the polymer chains and is measured by the procedure described in PCT Publication No. WO 93/03093, published Feb. 18, 1993, specifically columns 7 and 8, as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

"Catalyst productivity or catalyst activity" is a measure of the amount of polymer (P) produced per unit amount of polymerization catalyst. The catalyst productivity may be expressed in units of kilograms of polymer per kilogram of catalyst in a continuous process, and expressed in units of kilograms of polymer per kilogram of catalyst and per hour in a batch process.

A propylene polymer is a polymer having at least 50 mol % of propylene.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature which is defined as 25° C. unless otherwise specified, and tol is toluene.

Vinyl Terminated Macromonomers (VTMs)

This invention relates to ethylene copolymers comprising vinyl terminated macromonomers. Introduction of the macromonomers into ethylene copolymers is achieved through copolymerization of ethylene and vinyl terminated macromonomers. A "vinyl terminated macromonomer," (also referred to as a vinyl terminated polyolefin) as used herein, refers to one or more of:

(i) a vinyl terminated polymer having at least 50% allyl chain ends (preferably 60%, 70%, 80%, 90%, 95%, 98%, or 99%);
(ii) a vinyl terminated polymer having an Mn of at least 160 g/mol, preferably at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;
(iii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;
(iv) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;
(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;
(vi) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum and/or less than 250 regio defects per 10,000 monomer units;
(vii) a propylene macromonomer, comprising: at least 50 mol % propylene and from 10 mol % to 50 mol % ethylene, wherein the macromonomer has: at least 90% allyl chain ends, an Mn of about 150 g/mol to about 20,000 g/mol, preferably 10,000 g/mol, and an isobutyl chain end to allylic vinyl group ratio of 0.8:1 to 1.2:1.0, wherein monomers having four or more carbon atoms are present at from 0 mol % to 3 mol %;
(viii) a propylene macromonomer, comprising: at least 50 mol % propylene, from 0.1 mol % to 45 mol % ethylene, and from 0.1 mol % to 5 mol % $C_4$ to $C_{12}$ olefin, wherein the macromonomer has: at least 90% allyl chain ends, an Mn of about 150 g/mol to about 10,000 g/mol, and an isobutyl chain end to allylic vinyl group ratio of 0.8:1 to 1.35:1.0;
(ix) a propylene macromonomer, comprising: at least 50 mol % propylene, from 0.1 mol % to 45 mol % ethylene, and from 0.1 mol % to 5 mol % diene, wherein the macromonomer has: at least 90% allyl chain ends, an Mn of about 150 g/mol to about 10,000 g/mol, and an isobutyl chain end to allylic vinyl group ratio of 0.7:1 to 1.35:1.0;
(x) a homo-macromonomer, comprising propylene, wherein the macromonomer has: at least 85% allyl chain ends, an Mn of about 500 g/mol to about 70,000 g/mol, alternately to about 20,000 g/mol, an isobutyl chain end to allylic vinyl group ratio of 0.8:1 to 1.2:1.0, and less than 1400 ppm aluminum;
(xi) vinyl terminated polyethylene having: (a) at least 60% allyl chain ends; (b) a molecular weight distribution of less than or equal to 4.0; (c) a g'$_{vis}$ of greater than 0.95; and (d) an Mn ($^1$H NMR) of at least 20,000 g/mol; and
(xii) vinyl terminated polyethylene having: (a) at least 50% allyl chain ends; (b) a molecular weight distribution of less than or equal to 4.0; (c) a g'$_{vis}$ of 0.95 or less; (d) an Mn ($^1$H NMR) of at least 7,000 g/mol; and (e) a Mn (GPC)/Mn ($^1$H NMR) in the range of from about 0.8 to about 1.2.

In a preferred embodiment, any VTM described herein may have an isobutyl chain end to allylic vinyl group ratio of 0.8:1 to 1.35:1.0, alternately 0.7:1 to 1.35:1.0, alternately 0.8:1 to 1.2:1.0.

Vinyl terminated macromonomer or polymer chains have saturated chain end(s) and an unsaturated chain end. The term "vinyl termination", also referred to as allyl chain end(s)" or "vinyl chain" is defined to be a macromonomer having at least one terminus represented by $CH_2CH\!-\!\!CH_2-$, as shown in formula A:

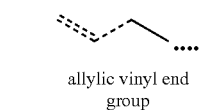

allylic vinyl end group where the "••••" represents the rest of an macromonomer or polymer chain. In a preferred embodiment the allyl chain end is represented by the formula B:

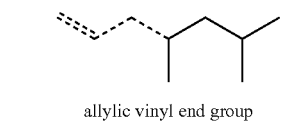

allylic vinyl end group

The amount of allyl chain ends (also called % vinyl termination) is determined using $^1$H NMR at 120° C. using deuterated tetrachloroethane as the solvent on a 500 MHz machine and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene macromonomers in J American Chemical Society, 114, 1992, pp. 1025-1032 that are useful herein.

The percent of allyl chain ends is reported as the molar percentage of allylic vinyl groups relative to total moles of unsaturated chain ends.

The branched macromonomers or polymers also have at least one saturated chain end which may comprise an isobutyl chain end. "Isobutyl chain end" is defined to be an chain end or terminus of macromonomer or polymer represented by the formula:

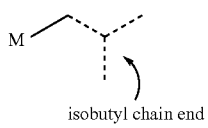

isobutyl chain end where M represents the rest of a macromonomer chain.

The structure of the polymer near the saturated chain end may differ, depending on the types and amounts of monomer(s) used, and mechanism of monomer insertion during the polymerization process. In some preferred embodiments, where the branched polyolefins comprise propylene-derived units and $C_4$ to $C_{40}$ alpha olefin derived units, the structure of the polymer within four carbons of the isobutyl chain end is represented by one of the following formulae:

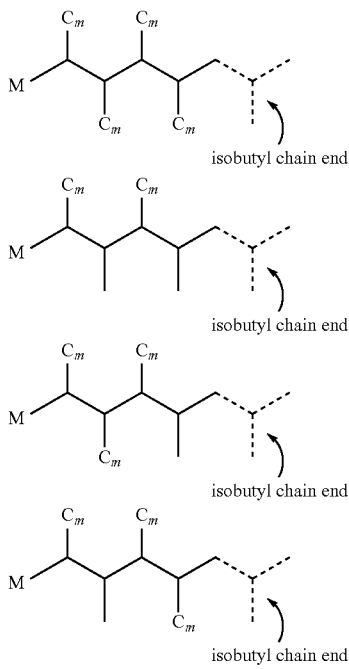

where M represents the rest of the macromonomer chain and $C_m$ represents the polymerized monomer, each $C_m$ may be the same or different, and where m is an integer from 2 to 8.

The percentage of isobutyl end groups is determined using $^{13}C$ NMR (as described in the example section) and the chemical shift assignments in Resconi et al, J Am. Chem. Soc., 1992, 114, pp. 1025-1032 for 100% propylene macromonomers.

The ratio of isobutyl chain ends to allylic vinyl chain ends is defined to be the ratio of the percentage of isobutyl chain ends to the percentage of allylic vinyl chain ends. For linear macromonomer or polymer, the isobutyl chain end to allyl chain end ratio is a representation of the number of vinyl groups present per polymer chain. For example, an isobutyl chain end to allylic vinyl group ratio of about 1:1 indicates that there is, on average, about one allylic vinyl group present per polymer chain. The ratio of isobutyl chain end to all unsaturated chain end is also an indication of level branching for branched polymers. Branched polymer chains have more than one saturated chain ends.

In another embodiment, the vinyl terminated macromonomers are amorphous, and have no detectable melting peak and crystallization peaks on the DSC. Alternatively, the vinyl terminated macromonomers have a heat of fusion of 10 J/g or less, preferably 5 J/g or less or 0 J/g or less.

In another embodiment, the vinyl terminated macromonomers are amorphous and branched. As used herein the term "branched macromonomer" is defined as the polymer molecular architecture obtained when an macromonomer chain with reactive polymerizable chain ends is incorporated into another polymer macromonomer during the polymerization of the latter to form a structure comprising a backbone defined by one of the macromonomer chains with branches of the other macromonomer chains extending from the backbone. Branched macromonomer differs structurally from short chain branches which are formed through incorporation of comonomer such as 1-butene, 1-hexene and 1-octene. Short-chain branched macromonomers are referred as to linear polymers. Linear macromonomer differs structurally from the branched macromonomer because of lack of the extended side arms.

In another embodiment, the vinyl terminated macromonomers are crystalline, and have melting temperature of at least 10° C., preferably at least 30° C., or at least 40° C., or at least 50° C., or at least 60° C., or at least 70° C., or at least 80° C., or at least 90° C., or at least 100° C. as determined according to ASTM D3418-03. Conveniently, the macromonomer typically has a melting temperature of 60° C. or more, and generally 70° C. or more, such as 80° C. or more, for example 90° C. or more. In an embodiment, the macromonomer may have a melting point by DSC ranging from an upper limit of 130° C., 120° C., 110° C., 100° C., or 90° C., to a lower limit of 5° C., 10° C., 20° C., 30° C., 40° C., or 50° C.

In an embodiment, the macromonomer has crystallization temperature of 130° C. or less. Alternatively, the macromonomer has a crystallization temperature by DSC ranging from an upper limit of 120° C., 100° C., 90° C., 70° C., or 40° C., to a lower limit of 0° C., 10° C., 30° C., 40° C., or 70° C.

In another embodiment, the vinyl terminated macromonomers have a crystallinity of 80% or less, typically 70% or less, as calculated using heat of fusion obtained from DSC analysis. The heat of fusion for 100% crystallinity is selected from the homopolymer of the primary composition in the copolymer. For example, when the macromonomer is made of ethylene/hexene copolymer, ethylene is the primary composition, and the heat of fusion of 100% crystalline polyethylene is used (e.g. 290 J/g). In one embodiment, the macromonomer has a heat of fusion between about 10 and about 270 J/g, for example between about 30 and about 200 J/g, such as between about 40 and about 200 J/g.

In another embodiment, the vinyl terminated macromonomer described herein may have a glass transition temperature of less than 0° C., preferably −10° C. or less, more preferably −20° C. or less, more preferably −30° C. or less, more preferably −50° C. or less. Glass transition temperature is determined according to ASTM D3418-03.

In another embodiment, any vinyl terminated macromonomer described herein has a chain length of less than the entanglement of a linear chain with same composition.

In another embodiment of the invention, the vinyl terminated macromonomer (preferably a propylene based vinyl terminated macromonomer, preferably a homopolypropylene vinyl terminated macromonomer) has less than 1 mol % regio defects (as determined by $^{13}$C NMR), based upon the total propylene monomer. Three type defects are defined to be the regio defects: 2,1-erythro, 2,1-threo, and 3,1-isomerization. The structures and peak assignments for these are given in L. Resconi, L. Cavallo, A. Fait, and F. Piemontesi, Chem. Rev. 2000, 100, pp. 1253-1345, as well as H. N. Cheng, Macromolecules, 17, p. 1950 (1984). Alternately, the vinyl terminated macromonomer (preferably a propylene based vinyl terminated macromonomer, preferably a homopolypropylene vinyl terminated macromonomer) has less than 250 regio defects per 10,000 monomer units (as determined by $^{13}$C NMR), preferably less than 150, preferably less than 100, preferably less than 50 regio defects per 10,000 monomer units. The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, $CH$, $CH_2$), and multiplied by 10000 to determine the defect concentration per 10000 monomers.

In a particularly preferred embodiment of the invention, the vinyl terminated macromonomer (preferably comprising propylene, at least 50 mole % propylene, preferably at least 70 propylene) has less than 250 regio defects per 10,000 monomer units, preferably less than 150, preferably less than 100, preferably less than 50 regio defects per 10,000 monomer units and a Tg of less than 0° C. or less (DSC), preferably −10° C. or less, more preferably −20° C. or less, more preferably −30° C. or less, more preferably −50° C. or less In another embodiment, the vinyl terminated macromonomers described herein have a viscosity at 60° C. of greater than 500 mPa·sec, greater than 1000 mPa·sec, or greater than 10,000 mPa·sec. In other embodiments, the vinyl terminated macromonomer have a viscosity of less than 200,000 mPa·sec, less than 150,000 mPa·sec, or less than 100,000 mPa·sec. Viscosity is defined as resistance to flow and the melt viscosity of neat copolymers is measured at elevated temperature using a Brookfield Digital Viscometer.

In another embodiment the VTM described herein also has a viscosity at 190° C. (also referred to a Brookfield Viscosity or Melt Viscosity) of 90,000 mPa·sec or less or 80,000 or less, or 70,000 or less, or 60,000 or less, or 50,000 or less, or 40,000 or less, or 30,000 or less, or 20,000 or less, or 10,000 or less, or 8,000 or less, or 5,000 or less, or 4,000 or less, or 3,000 or less, or 1,500 or less, or between 250 and 15,000 mPa·sec, or between 500 and 5,500 mPa·sec, or between 500 and 3,000 mPa·sec, and/or a viscosity at 160° C. of 8,000 mPa·sec or less or 7,000 or less, or 6,000 or less, or 5,000 or less, or 4,000 or less, or 3,000 or less, or 1,500 or less, or between 250 and 6,000 mPa·sec, or between 500 and 5,500 mPa·sec, or between 500 and 3,000 mPa·sec, or between 500 and 1,500 mPa·sec. The viscosity is determined according to ASTM D3236.

In another embodiment, the vinyl terminated macromonomers described herein are a liquid at 25° C. and soluble to aliphatic and aromatic solvents at room temperature.

In another embodiment, the vinyl terminated macromonomers are amorphous and have a Mn of 7500 g/mol or less (measured by $^1$H NMR). Preferably, vinyl terminated macromonomer is a propylene homopolymer.

It is understood by those of ordinary skill in the art that when the VTM's, as described here, are reacted with another material the "vinyl" (e.g. the allyl chain end) is involved in the reaction and has been transformed. Thus, language indicating that a fragment of the final product (typically referred to as PO in the formulae herein) is the residual portion of a vinyl terminated macromonomer (VTM) and or a VTM having had a terminal unsaturated carbon of an allylic chain and a vinyl carbon adjacent to the terminal unsaturated carbon, is meant to refer to the fact that the VTM has been incorporated in the product. Similarly stating that a product or material comprises a VTM means that the reacted form of the VTM is present, unless the context clearly indicates otherwise (such as a mixture of ingredients that do not have a catalytic agent present).

In some embodiments, the vinyl terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprises one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 50% (at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers are further described in U.S. patent application Ser. No. 13/072,288, now U.S. Pat. No. 8,426,659, which is hereby incorporated by reference.

In some embodiments, the vinyl terminated macromonomers may have an Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from about 20 mol % to 99.9 mol % (e.g., from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (e.g., $C_6$ to $C_{20}$) higher olefin; and (b) from about 0.1 mol % to 80 mol % (e.g., from about 5 mol % to 70 mol %, from about 10 mol % to about 65 mol %, from about 15 mol % to about 55 mol %, from about 25 mol % to about 50 mol %, or from about 30 mol % to about 80 mol %) of propylene; wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. patent application Ser. No. 13/072,249, now U.S. Pat. No. 8,399,724, hereby incorporated by reference.

In another embodiment, the vinyl terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from about 80 mol % to about 99.9 mol % of at least one $C_4$ olefin, e.g., about 85 mol % to about 99.9 mol %, e.g., about 90 mol % to about 99.9 mol %;

(b) from about 0.1 mol % to about 20 mol % of propylene, e.g., about 0.1 mol % to about 15 mol %, e.g., about 0.1 mol % to about 10 mol %; and wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Ser. No. 13/072,249, now U.S. Pat. No. 8,399,724, which is hereby incorporated by reference.

In other embodiments, the vinyl terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7,000 g/mol), comprising 10 mol % to 90 mol % propylene (e.g., 15 mol % to 85 mol %, e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % to 70 mol %, e.g., 10 mol % to 50 mol %) of one or more alpha-olefin comonomers (e.g., ethylene, butene, hexene, or octene, e.g., ethylene), wherein the macromonomer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50 (−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 mol % to 90 mol % ethylene is present in the co-oligomer. Such macromonomers are further described in U.S. patent application Ser. No. 12/143,663, now U.S. Pat. No. 8,372,930, which is hereby incorporated by reference.

In other embodiments, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % to 2 mol %), wherein the macromonomer has: at least 93% allyl chain ends (e.g., at least 95%, e.g., at least 97%, e.g., at least 98%); a number average molecular weight (Mn) of about 400 g/mol to about 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. patent application Ser. No. 12/143,663 now U.S. Pat. No. 8,372,930.

In other embodiments, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the macromonomer has: at least 90% allyl chain ends (e.g., at least 91%, e.g., at least 93%, e.g., at least 95%, e.g., at least 98%); an Mn of about 150 g/mol to about 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %, e.g., less than 0.5 mol %, e.g., at 0 mol %). Such macromonomers are further described in U.S. patent application Ser. No. 12/143,663 now U.S. Pat. No. 8,372,930.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the macromonomer has: at least 90% allyl chain ends (e.g., at least 91%, e.g., at least 93%, e.g., at least 95%, e.g., at least 98%); a number average molecular weight (Mn) of about 150 g/mol to about 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. patent application Ser. No. 12/143, 663 now U.S. Pat. No. 8,372,930.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the macromonomer has at least 90% allyl chain ends (e.g., at least 91%, e.g., at least 93%, e.g., at least 95%, e.g., at least 98%); a number average molecular weight (Mn) of about 150 g/mol to about 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. patent application Ser. No. 12/143,663 now U.S. Pat. No. 8,372,930.

In other embodiments, the vinyl terminated macromonomer is a propylene homo-oligomer, comprising propylene and less than 0.5 wt % comonomer, e.g., 0 wt % comonomer, wherein the macromonomer has:

i) at least 93% allyl chain ends (e.g., at least 95%, e.g., at least 96%, e.g., at least 97%, e.g., at least 98%, e.g., at least 99%);

ii) a number average molecular weight (Mn) of about 500 g/mol to about 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);

iii) an isobutyl chain end to allylic vinyl group ratio of 0.8:1 to 1.3:1.0; and iv) less than 1400 ppm aluminum, (e.g., less than 1200 ppm, e.g., less than 1000 ppm, e.g., less than 500 ppm, e.g., less than 100 ppm). Such macromonomers are also further described in U.S. patent application Ser. No. 12/143,663 now U.S. Pat. No. 8,372,930.

The vinyl terminated macromonomers may be homopolymers, copolymers, terpolymers, and so on. Any vinyl terminated macromonomers described herein has one or more of:

(i) an isobutyl chain end to allylic vinyl group ratio of 0.8:1 to 1.3:1.0;

(ii) an allyl chain end to vinylidene chain end ratio of greater than 2:1 (e.g., greater than 2.5:1, greater than 3:1, greater than 5:1, or greater than 10:1);

(iii) an allyl chain end to vinylene ratio greater than 1:1 (e.g., greater than 2:1 or greater than 5:1); and (iv) at least 50% allyl chain ends (preferably 60%, 70%, 80%, 90%, 95%, 98%, or 99%).

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end.

An allyl chain end is represented by $CH_2CH—CH_2—$, as shown in the formula:

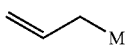

where M represents the rest of the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR according to the procedure described in the Example section. A 3-alkyl chain end (where the alkyl is a $C_1$ to $C_{38}$ alkyl), also referred to as a "3-alkyl vinyl end group" or a "3-alkyl vinyl termination", is represented by the formula:

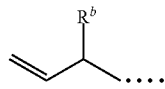

where "••••" represents the polyolefin chain and Rb is a C1 to C38 alkyl group, or a C1 to C20 alkyl group, such as methyl, ethyl, propyl, butyl, pentyl, hexyl, heptyl, octyl, nonyl, decyl, undecyl, dodecyl, and the like. The amount of 3-alkyl chain ends is determined using 13C NMR as set out below.

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

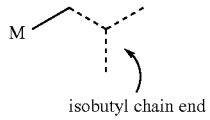

isobutyl chain end where M represents the rest of polymer chain. Isobutyl chain ends are determined according to the procedure set out in PCT Publication No. WO 2009/155471. The "isobutyl chain end to allylic vinyl group ratio" is defined to be the ratio of the percentage of isobutyl chain ends to the percentage of allyl chain ends. The "isobutyl chain end to alpha bromo carbon ratio" is defined to be the ratio of the percentage of isobutyl chain ends to the percentage of brominated chain ends (at about 34 ppm).

In polymerizations comprising $C_4$ or greater monomers (or "higher olefin" monomers), the saturated chain end may be a $C_4$ or greater (or "higher olefin") chain end, as shown in the formula below:

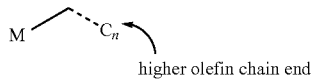

higher olefin chain end where M represents the polymer chain and n is an integer selected from 4 to 40. This is especially true when there is substantially no ethylene or propylene in the polymerization. In an ethylene/(C4 or greater monomer) copolymerization, the polymer chain may initiate growth in an ethylene monomer, thereby generating a saturated chain end which is an ethyl chain end.

Macromonomers useful herein may be produced by process know in the art to make vinyl terminated polymers, including solution process with a homogeneous catalyst system and a gas phase process with a supported catalyst.

In an embodiment, the polyolefin is derived from a vinyl terminated propylene polymer. In a preferred embodiment, the vinyl terminated propylene polymer is produced using a process comprising: contacting propylene, under polymerization conditions, with a catalyst system comprising an activator and at least one metallocene compound represented by the formula:

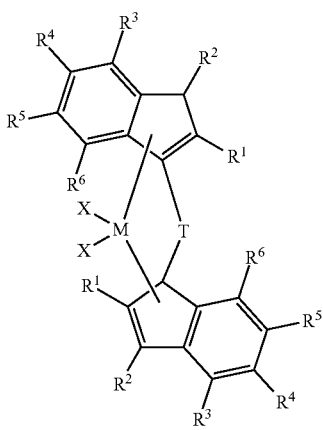

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$ is, independently, a $C_1$ to $C_{10}$ alkyl group;
each $R^2$ is, independently, a $C_1$ to $C_{10}$ alkyl group;
each $R^3$ is hydrogen;
each $R^4$, $R^5$, and $R^6$, is, independently, hydrogen or a substituted hydrocarbyl or unsubstituted hydrocarbyl group, or a heteroatom;
T is a bridging group; and
further provided that any of adjacent $R^4$, $R^5$, and $R^6$ groups may form a fused ring or multicenter fused ring system where the rings may be aromatic, partially saturated or saturated; and
obtaining a propylene polymer having at least 50% allyl chain ends (relative to total unsaturations), as described in co-pending U.S. patent application Ser. No. 13/072,280, filed Mar. 25, 2011, now U.S. Pat. No. 8,455,597, which is incorporated by reference in its entirety herein.

In an embodiment, the vinyl terminated propylene polymer is produced using a process comprising:
1) contacting:
  a) one or more olefins with
  b) a transition metal catalyst compound represented by the formula:

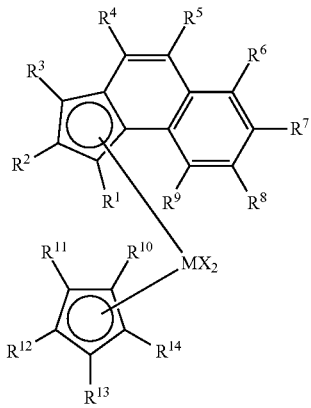

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and
each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and
2) obtaining vinyl terminated polymer having an Mn of 300 g/mol or more and at least 30% allyl chain ends (relative to total unsaturation), as described in co-pending U.S. patent application Ser. No. 13/072,279, filed Mar. 25, 2011, now U.S. Pat. No. 8,318,998, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:
(i) from about 20 to about 99.9 mol % of at least one $C_5$ to $C_{40}$ higher olefin; and
(ii) from about 0.1 mol % to about 80 mol % of propylene;
wherein the higher olefin copolymer has at least 40% allyl chain ends, as described in U.S. patent application Ser. No. 13/072,249, filed Mar. 25, 2011, now U.S. Pat. No. 8,399,724, which is incorporated by reference in its entirety herein.

In an embodiment, the polyolefin chain is derived from a vinyl terminated branched polyolefin. In an embodiment, the vinyl terminated branched polyolefin has an Mn ($^1$H NMR) of 7,500 to 60,000 g/mol, comprising one or more alpha olefin derived units comprising ethylene and/or propylene, and having;
(i) 50% or greater allyl chain ends, relative to total number of unsaturated chain ends; and
(ii) a $g'_{vis}$ of 0.90 or less, as described in U.S. Patent Application No. 61/467,681, filed Mar. 25, 2011, which is incorporated by reference in its entirety herein.

In an embodiment of the invention, the polyolefin is derived from a vinyl terminated ethylene polymer, preferably a vinyl terminated polyethylene having:
(a) at least 60% allyl chain ends (preferably at least 65%, preferably at least 70%, preferably at least 75%, preferably at least 80%, preferably at least 85%, preferably at least 90%, preferably at least 95%, preferably at least 96%, preferably at least 97%, preferably at least 98%, preferably at least 99%, or preferably at least 100%);
(b) a molecular weight distribution of less than or equal to 4.0 (preferably less than or equal to 3.8, preferably less than or equal to 3.5, preferably less than or equal to 3.2, preferably less than or equal to 3.0, preferably less than or equal to 2.8, or preferably less than or equal to 2.5);
(c) an Mn ($^1$H NMR) of at least 20,000 g/mol (preferably at least 25,000 g/mol, preferably at least 30,000 g/mol, preferably at least 40,000 g/mol, preferably at least 50,000 g/mol, and, optionally, less than 125,000 g/mol, preferably less than 120,000, or preferably less than 110,000);
(d) optionally, an Mn (GPC)/Mn ($^1$H NMR) in the range of from about 0.8 to about 1.2 (preferably from about from 0.9 to about 1.1, preferably from about 0.95 to about 1.1); and
(e) optionally, a $g'_{vis}$ of greater than 0.95 (preferably greater than 0.96, preferably greater than 0.98, preferably greater than 0.98, and, optionally, preferably less than or equal to 1.0).

Preferably the vinyl terminated ethylene polymers are prepared by a process comprising:
(a) contacting ethylene with a supported metallocene catalyst system;
wherein the supported catalyst system comprises: (i) a support material; (ii) an activator having from about 1 wt % to about 14 wt % trimethylaluminum, based on the weight of the activator; (iii) a metallocene compound represented by the formula:

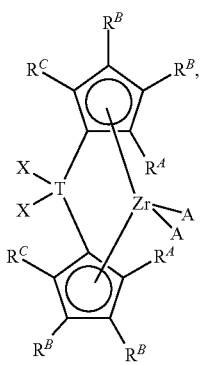

wherein: T is Si or Ge; each $R^A$ is a $C_1$ to $C_{20}$ substituted or unsubstituted hydrocarbyl group; each RB is, independently, H, or a $C_1$ to $C_8$ substituted or unsubstituted hydrocarbyl group, or a group represented by the formula —$CH_2R^x$; wherein $R^x$ is a $C_1$ to $C_{20}$ substituted or unsubstituted hydrocarbyl group, provided that at least one RB is methyl or a group represented by the formula —$CH_2R^x$; each $R^C$ is, independently, H or a $C_1$ to $C_{20}$ substituted or unsubstituted hydrocarbyl group; each A is independently selected from the group consisting of $C_1$ to $C_{20}$ substituted or unsubstituted hydrocarbyl groups, hydrides, amides, amines, alkoxides, sulfides, phosphides, halides, dienes, phosphines, and ethers; each X is, independently, hydrogen, halogen or a $C_1$ to $C_{20}$ hydrocarbyl, and two X groups can form a cyclic structure including aromatic, partially saturated, or saturated cyclic or fused ring system; further provided that any of adjacent $R^A$, $R^B$, and/or $R^C$ groups may form a fused ring or multicenter fused ring systems, where the rings may be substituted or unsubstituted, and may be aromatic, partially unsaturated, or unsaturated;
(b) obtaining a vinyl terminated polyethylene having: (i) at least 60% allyl chain ends; (ii) a molecular weight distribution of less than or equal to 4.0; and (iii) a Mn ($^1$H NMR) of at least 20,000 g/mol. Preferably the vinyl terminated ethylene polymers are made according the process (and using the catalyst systems) described in U.S. Patent Application Nos. 61/704,604 and 61/704,606, filed Sep. 24, 2012 or U.S. patent application Ser. No. 13/629,323 filed Sep. 27, 2012 now U.S. Pat. No. 8,802,797.

In an embodiment of the invention, the polyolefin is derived from a vinyl terminated ethylene polymer, preferably a vinyl terminated polyethylene having: (i) at least 50% allyl chain ends (preferably 60%, 70%, 80%, 90%, 95%, 96%, 97%, 98%, 99%, or 100%); (ii) a molecular weight distribution of less than or equal to 4.0 (preferably less than or equal to 3.8, 3.6, 3.5, 3.4, 3.2, 3.0, 2.8, or 2.5); (iii) a g'(vis) of 0.95 or less (preferably less than 0.93, 0.90, 0.88, or 0.85); (iv) an Mn ($^1$H NMR) of at least 7,000 g/mol (preferably at least 10,000 g/mol, 15,000 g/mol, 20,000 g/mol, 25,000 g/mol, 30,000 g/mol, 45,000 g/mol, 55,000 g/mol, 65,000 g/mol, or 85,000 g/mol, and, optionally, less than 125,000 g/mol); and (v) a Mn (GPC)/Mn ($^1$H NMR) in the range of from about 0.8 to about 1.2 (preferably from 0.85 to 1.15, 0.90 to 1.10, and 0.95 to 1.00).

In another embodiment, the vinyl terminated macromonomer may be a vinyl terminated ethylene macromonomer. In some embodiments, a phenoxyimine-based catalyst (a Mitsui FI catalyst) or a pyrroleimine-based catalyst (a Mitsui PI catalyst) can be used to prepare the vinyl terminated ethylene macromonomer. These catalysts comprise (a) a transition metal (preferably Ti) compound having phenoxyimine or pyrroleimine as a ligand, and (b) one or more kind(s) of compound selected from (b-1) an organic metal compound, (b-2) an organic aluminumoxy compound, and (b-3) a compound that reacts with the transition metal compound (a) to form an ion pair, as described in Japanese Publication Nos. JP-A-2001-72706, JP-A-2002-332312, JP-A-2003-313247, JP-A-2004-107486, and JP-A-2004-107563. Herein, as the transition metal contained in the transition metal compound, the transition metal of Groups 3 to 11 in the periodic table can be used. Preferred catalysts to prepare the vinyl terminated ethylene macromonomer include those described in U.S. Pat. No. 7,795,347, specifically at column 16, line 56 et seq. in Formula (XI).

In another embodiment, the vinyl terminated macromonomer may be a vinyl terminated isotactic polypropylene or a vinyl terminated polyethylene as disclosed in U.S. Pat. Nos. 6,444,773; 6,555,635; 6,147,180; 6,660,809; 6,750,307; 6,774,191; and 6,169,154 and European Patent No. EP 0 958 309, which are incorporated by reference herein.

Polyethylene Copolymers

This invention relates to an ethylene copolymer comprising vinyl terminated macromonomers. Introduction of macromonomers into ethylene copolymer is achieved by a copolymerization of ethylene and macromonomers.

The ethylene copolymer can be obtained when the macromonomers with at least one reactive polymerizable groups (such as allylic terminated chain end) is incorporated into a polymer chain during the polymerization. The resulting product comprises an ethylene/macromonomer copolymer with many side arms derived from the incorporated macromonomers. The side arms extended from a polymer backbone are also referred as to branches. The composition and length of the side arms depends on the composition and molecular weight of the macromonomers in a similar manner as the short chain branched (SCB) ethylene copolymer. In SCB polyethylene, incorporation of 1-butene, 1-hexene or 1-octene results in ethyl, butyl or hexyl branches, respectively, along the polymer backbone. Copolymers of ethylene and macromonomer differ from the SCB polyethylene in the arm lengths and composition. Since most vinyl terminated macromonomers are of high molecular weight and do not have a uniform molecular weight, the copolymers of ethylene and macromonomer have branches with arm length longer than 16 carbons. The distribution of arm length follows similar molecular weight distribution of the macromonomers employed in the polymerization.

The composition of vinyl terminated macromonomers can be different from that in the backbone. The copolymer of ethylene and macromonomers can be homogenous or heterogeneous in composition. For example, the copolymer comprises ethylene and propylene when propylene macromonomers are copolymerized with ethylene. This results in a copolymer with ethylene backbone and propylene side chains (i.e., polypropylene chain segment). Likewise, a copolymer with ethylene backbone and ethylene/propylene side chains can form when a vinyl terminated ethylene/propylene macromonomers are used in the polymerization. In a preferred embodiment, the ethylene copolymer comprises the same composition in the backbone as that in the side chains. In another preferred embodiment, the composition on the backbone is different from that in the side chains. More preferably, the side chains comprise propylene, preferably greater than 50 mol % propylene.

The number of branches and level of branches depend on the amount of macromonomer incorporated. One branch will typically be created by every macromonomer incorporated. Number of branches can be determined using $^{13}$C NMR. In one embodiment, the ethylene content is at least 70 wt %, preferably at least 80 wt %, even more preferably at least 90 wt %, and from about 0.5 to about 30 weight percent VTM. Alternatively, the macromonomer content is 5 mol % or less, preferably 4 mol % or less and more preferably 3.5 mol % or less. Preferably the macromonomer content is from 5 to 0.001 mol %, preferably from 5 to 0.01 mol %, preferably from 4 to 0.1 mol %, Number average molecular weight measured by $^1$H NMR is used to calculate molar concentration of macromonomers.

The length of branches and its distribution depend on the molecular weight distribution of macromonomers used. In one embodiment, the number averaged branch length is less than 200 carbons long, preferably less than 150 carbons long, more preferably less than 100 carbons long. One of advantages of the inventive material is its ability to adjust the chain length according to the needs of end uses. For example, short branches significantly interfere with the formation of crystal structures, while long chain branches have profound effects on rheology properties in molten state.

In an embodiment of this invention, the macromonomer branches are crystalline and have melting temperature of at least 10° C., preferably at least 30° C., or at least 40° C., or at least 50° C., or at least 60° C., or at least 70° C., or at least 80° C., or at least 90° C., or at least 100° C. as determined according to ASTM D3418-03. Conveniently, the macromonomer typically has a melting temperature of 60° C. or more, and generally 70° C. or more, such as 80° C. or more, for example 90° C. or more. In an embodiment, the macromonomer may have a melting point by DSC ranging from an upper limit of 130° C., 120° C., 110° C., 100° C., or 90° C., to a lower limit of 5° C., 10° C., 20° C., 30° C., 40° C., or 50° C.

In another embodiment, the macromonomer branches are amorphous with no detectable melting peak from DSC measurement and having a heat of fusion 5 J/g or less. Preferably the amorphous branches are amorphous polypropylene. Preferably, the molecular weight (measured by $^1$H NMR) of the amorphous propylene macromonomer is 5000 g/mol or less.

In another embodiment, the macromonomers are branched so the copolymer of ethylene/macromonomer has a hyper-branched (branch on branch) structure.

In one embodiment, the ethylene and macromonomer can be copolymerized with one or more monomers selected from $C_3$ to $C_{40}$ alpha olefins. Preferably, the copolymer produced herein is a terpolymer of 1) ethylene; 2) up to 20 mol % (preferably from 0.1 mol % to 15 mol %, preferably from 1 mol % to 10 mol %) of one or more $C_4$ to $C_{40}$ (preferably $C_4$ to $C_{20}$, preferably $C_6$ to $C_{12}$) olefins, preferably alpha olefins (preferably 1-butene, 1-hexene, and 1-octene); and 3) macromonomers (preferably present at 2 mol %, or less, preferably 1 mol % or less, more preferably 0.5 mol % or less).

In one embodiment, the ethylene and macromonomer can be copolymerized with at least one polyene with at least two polymerizable chain ends to create cross-linked copolymers. Incorporation of diene in polymerization process is often catalyst specific. For polymerization with metallocene catalysts, examples of useful polymerizable polyenes include butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, tetrahydroindene, norbornadiene also known as bicyclo-(2.2.1)-hepta-2,5-diene, dicyclopentadiene, 5-vinyl-2-norbornene, 1,4-cyclohexadiene, 1,5-cyclooctadiene, 1,7-cyclododecadiene, and vinyl cyclohexene.

Branching structure of the ethylene/macromonomer copolymers can be detected using GPC-3D as described in the experimental section below. A branching index $g'_{vis}$ is used to measure the level of branching. In one embodiment, the ethylene/macromonomer copolymer has a $g'_{vis}$ of less than 0.80, preferably 0.70 or less, more preferably 0.65 or less, preferably 0.60 or less, even more preferably 0.55 or less. The $g'_{vis}$ is calculated using the intrinsic viscosity of linear homo-polyethylene according to the procedure described in the Experimental section. Branching structures of ethylene/macromonomer copolymer also have smaller radius of gyration as compared with that of a linear homo-polyethylene of the same molecular weight. Radius gyration can be determined by using GPC with multiple angle light scattering detector. In one embodiment, the ratio of radius gyration of the present ethylene/macromonomer copolymer to the radius gyration of ethylene homo-polymer at the same molecular weight (the "g value") is of 0.9 or less, preferably 0.8 or less, more preferably 0.7 or less. The "g value" is defined to be $Rg^2_{pm}/Rg^2_{ls}$, where $Rg_{pm}$ is the radius of gyration for the ethylene/macromonomer copolymer, $Rg^2_{ls}$ is the radius of gyration for the linear standard, and $Rg_{ls}=K_sM^{0.58}$ where $K_s$ is the power law coefficient (0.023 for linear polyethylene, 0.0171 for linear polypropylene, and 0.0145 for linear polybutene), and M is the molecular weight as described above, $Rg_{pm}=K_TM^{\alpha_s}$. $\alpha_s$ is the size coefficient for the ethylene/macromonomer copolymer, $K_T$ is the power law coefficient for the polymacromer. See Macromolecules, 2001, 34, 6812-6820, for guidance on selecting a linear standards having the molecular weight and comonomer content, and determining K coefficients and a exponents.

The ethylene/macromonomer copolymers have similar rheological behavior to that of long chain branched polyethylene. Branched structures through incorporation of macromonomers can also be observed by Small Amplitude Oscillatory Shear (SAOS) measurement of the molten polymer performed on a dynamic (oscillatory) rotational rheometer. From the data generated by such a test it is possible to determine the phase or loss angle δ, which is the inverse tangent of the ratio of G" (the loss modulus) to G' (the storage modulus). For a typical linear polymer, the loss angle at low frequencies (or long times) approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. In contrast, a branched chain polymer relaxes very slowly, because the branches need to retract first before the chain backbone can relax along its tube in the melt. This polymer never reaches a state where all its chains can relax during an oscillation, and the loss angle never reaches 90 degrees even at the lowest frequency, co, of the experiments. The loss angle is also relatively independent of the frequency of the oscillations in the SAOS experiment; another indication that the chains cannot relax on these timescales.

As known by one of skill in the art, rheological data may be presented by plotting the phase angle versus the absolute value of the complex shear modulus (G*) to produce a van Gurp-Palmen plot. The plot of conventional linear polyethylene polymers shows monotonic behavior and a negative slope toward higher G* values. Conventional LLDPE polymer without long chain branches exhibit a negative slope on the van Gurp-Palmen plot. For ethylene/macromonomer copolymers, the phase angels shift to a lower value as compared with the phase angle of a conventional ethylene polymer without long chain branches at the same value of G*. The van Gurp-Palmen plots of some embodiments of the ethylene/macromonomer copolymers described in the present disclosure exhibit two slopes—a positive slope at lower G* values and a negative slope at higher G* values.

In a plot of the phase angle δ versus the measurement frequency ω, ethylene/macromonomer copolymers exhibit a plateau in the function of δ(ω), whereas linear polymers do not have such a plateau. According to Garcia-Franco et al. (Macromolecules 2001, 34, No. 10, pp. 3115-3117), the plateau in the aforementioned plot will shift to lower phase angles δ when the amount of macromonomers incorporated in the polymer sample increases. Dividing the phase angle at which the plateau occurs by a phase angle of 90°, one obtains the critical relaxation exponent n which can then be used to calculate a gel stiffness using the equation:

$$\eta^*(\omega)=S\Gamma(1-n)\omega^{n-1}$$

wherein $\eta^*$ represents the complex viscosity (Pa·sec), ω represents the frequency, S is the gel stiffness, Γ is the gamma function (see Beyer, W. H. Ed., CRC Handbook of Mathematical Sciences $5^{th}$ Ed., CRC Press, Boca Rotan, 1978) and n is the critical relaxation exponent. Polymers produced herein preferably have a gel stiffness of more than 150 Pa·sec, preferably at least 300 Pa·sec and more preferably at least 500 Pa·sec. The gel stiffness is determined at the test temperature of 190° C. A preferred critical relaxation exponent n for the polymers produced herein is less than 1 and more than 0, generally, n will be between 0.1 and 0.92, preferably between 0.2 and 0.85.

Small amplitude oscillatory shear data can be transformed into discrete relaxation spectra using the procedure on pp. 273-275 in R. B. Bird, R. C. Armstrong, and O. Hassager, Dynamics of Polymeric Liquids, Volume 1, Fluid Mechanics, $2^{nd}$ Edition, John Wiley and Sons, (1987). The storage and loss moduli are simultaneously least squares fit with the functions, $$G'(\omega_j)=\Sigma\eta_k\lambda_k\omega_j^2/(1+(\eta_k\omega_k)^2)$$

$$G''(\omega_j)=\Sigma\eta_k\lambda_k\omega_j/(1+(\eta_k\omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of macromonomer incorporated is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. For the ethylene/macromonomer copolymers of this invention the viscosity fraction of the 100 second relaxation time is preferably at least 0.1, more preferably 0.4, and most preferably 0.8. In contrast, viscosity fractions of 100 second chains of conventional polyethylene are of the order of 0.10 or less and of conventional propylene/ethylene copolymers are of the order of 0.10 or less. Chains (side arms) with long relaxation times cannot relax during the cycle time of the small amplitude oscillatory shear experiment and lead to high zero shear viscosities.

The ethylene/macromonomer copolymers of this invention preferably have good shear thinning Shear thinning is characterized by the decrease of the complex viscosity with increasing shear rate. One way to quantify the shear thinning is to use a ratio of complex viscosity at a frequency of 0.1 rad/s to the complex viscosity at a frequency of 100 rad/s. Preferably, the complex viscosity ratio of the ethylene/macromonomer copolymers is 15 or more, more preferably 25 or more, even more preferably 50 or more when the complex viscosity is measured at 190° C.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log (dynamic viscosity) at a frequency of 0.01 rad/s divided by 4. These plots are the typical output of small amplitude oscillatory shear (SAOS) experiments. For purposes of this invention, the SAOS test temperature is 190° C. for ethylene polymers. Polymer viscosity is conveniently measured in Pascal·seconds (Pa·sec) at shear rates within a range of from 0.01 to 398 rad/sec and at 190° C. under a nitrogen atmosphere using a dynamic mechanical spectrometer such as the Advanced Rheometrics Expansion System (ARES). Generally a low value of shear thinning index indicates that the polymer is highly shear-thinning and that it is readily processable in high shear processes, for example by injection molding. The more negative this slope, the faster the dynamic viscosity decreases as the frequency increases. Preferably, the modifier has a shear thinning index of less than −0.2. These types of modifiers are easily processed in high shear rate fabrication methods, such as injection molding.

The ethylene/macromonomer copolymers described herein also preferably have characteristics of strain hardening in extensional viscosity. An important feature that can be obtained from extensional viscosity measurements is the attribute of strain hardening in the molten state. Strain hardening is observed as a sudden, abrupt upswing of the extensional viscosity in the transient extensional viscosity vs. time plot. This abrupt upswing, away from the behavior of a linear viscoelastic material, was reported in the 1960s for LDPE (reference: J. Meissner, Rheol. Acta., Vol. 8, p. 78, 1969) and was attributed to the presence of long branches in the polymer. The strain-hardening ratio (SHR) is defined as the ratio of the maximum transient extensional viscosity over three times the value of the transient zero-shear-rate viscosity at the same strain rate. Strain hardening is present in the material when the ratio is greater than 1. In one embodiment, the ethylene/macromonomer copolymers have strain-hardening in extensional viscosity. Preferably the strain-hardening ratio is 1.5 or greater, preferably 2 or greater, more preferably 5 or greater, and even more preferably 8 or more when extensional viscosity is measured at a strain rate of 1 $sec^{-1}$ and at a temperature of 150° C.

The ethylene/macromonomer copolymers preferably have a density in a range of from 0.840 $g/cm^3$ to 0.960 $g/cm^3$ in one embodiment, from 0.850 $g/cm^3$ to 0.96 $g/cm^3$ in a more particular embodiment, from 0.850 $g/cm^3$ to 0.920 $g/cm^3$ in yet a more particular embodiment, from 0.860 $g/cm^3$ to 0.930 $g/cm^3$ in yet a more particular embodiment, from 0.870 $g/cm^3$ to 0.92 $g/cm^3$ in yet a more particular embodiment, less than 0.925 $g/cm^3$ in yet a more particular embodiment, less than 0.920 $g/cm^3$ in yet a more particular embodiment, and less than 0.900 $g/cm^3$ in yet a more particular embodiment.

When produced in a gas-phase or a slurry process, the ethylene/macromonomer copolymers of the invention have a bulk density of from 0.400 to 0.900 $g/cm^3$ in one embodiment, and from 0.420 to 0.800 $g/cm^3$ in another embodiment, and from 0.430 to 0.500 $g/cm^3$ in yet another embodiment, and from 0.440 to 0.60 $g/cm^3$ in yet another embodiment, wherein a desirable range may comprise any upper bulk density limit with any lower bulk density limit described herein. Bulk density is determined as follows. Granular polymer particles are poured via a ⅞" (2.2 cm) diameter funnel into a fixed volume cylinder of 400 mL. The bulk density is measured as the weight of resin divided by 400 mL to give a value in g/ml.

Preferably, the ethylene/macromonomer copolymers have a melt index as measured by ASTM D-1238 at 190° C. and 2.16 kg in the range of from 0.01 dg/min to 100 dg/min in one embodiment, from 0.01 dg/min to 50 dg/min in a more particular embodiment, from 0.02 dg/min to 20 dg/min in yet a more particular embodiment, and from 0.03 dg/min to 2 dg/min in yet a more particular embodiment, and from 0.002 dg/min to 1 dg/min in yet a more particular embodiment. Alternatively, the ethylene/macromonomer copolymers has a melt index as measured by ASTM D-1238 at 190° C. of 20 dg/min or less, preferably 5 dg/min or less, more preferably 1 dg/min or less.

Preferably, the HLMI (ASTM D 1238 190° C., 21.6 kg) of the ethylene/macromonomer copolymers ranges from 0.01 to 800 dg/min in one embodiment, and from 0.1 to 500 dg/min in another embodiment, and from 0.5 to 300 dg/min in yet a more particular embodiment, and from 1 to 100 dg/min in yet a more particular embodiment wherein a desirable range is any combination of any upper I21 limit with any lower I21 limit. Alternatively, the HLMI of the ethylene/macromonomer copolymers is less than 30 dg/min, preferably 20 dg/min. HLMI is also referred as to I21.

The ethylene/macromonomer copolymers useful herein preferably have a melt index ratio (MIR, or I21/I2) of from 10 to 500 in one embodiment, from 15 to 300 in a more particular embodiment, and from 20 to 200 in yet a more particular embodiment. Alternately, the ethylene/macromonomer copolymers may have a melt index ratio of from greater than 15 in one embodiment, greater than 20 in a more particular embodiment, greater than 30 in yet a more particular embodiment, greater than 40 in yet a more particular embodiment, and greater than 50 in yet a more particular embodiment.

The ethylene/macromonomer copolymers preferably has an Mw of 10,000 to 2,000,000 g/mol, preferably 20,000 to 1,000,000 g/mol, more preferably 30,000 to 500,000 g/mol, more preferably 100,000 g/mol or more, as measured by size exclusion chromatography, as described below in the Experimental section below, and/or an Mw/Mn of 2 to 100, preferably 2.5 to 80, more preferably 3 to 60, more preferably 3 to 50 as measured by size exclusion chromatography, and/or a Mz/Mw of 2 to 50, preferably 2.5 to 30, more preferably 3 to 20, more preferably 3 to 25. The Mw referred to herein, and for purposes of the claims attached hereto, is obtained from GPC using a light scattering detector as described in the Experimental section below.

In any embodiment of the invention described herein the ethylene/macromonomer copolymers may have a complex viscosity at 0.1 rad/sec and a temperature of 190° C. of at least 500 Pa·sec (preferably at least 5000 Pa·sec, preferably from 5000 to 150,000 Pa·sec, preferably from 10,000 to 100,000 Pa·sec).

The ethylene/macromonomer copolymers preferably have crystallization temperature of 115° C. or less, more preferably 110° C. or less, more preferably 100° C. or less. In another embodiment, the ethylene/macromonomer copolymers have a melting temperature of 130° C. or less, more preferably 120° C. or less. In an embodiment, the ethylene/macromonomer copolymers may have a melting point by DSC ranging from an upper limit of 130° C., 120° C., 110° C., 100° C., or 90° C., to a lower limit of 5° C., 10° C., 20° C., 30° C., 40° C., or 50° C.

In another embodiment, the ethylene/macromonomer copolymers have heat of fusion of 120 J/g or less.

The ethylene/macromonomer copolymers described herein are useful in a wide variety of applications, including transparent articles such as cook and storageware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important.

Additional examples of desirable articles of manufacture made from compositions of the invention include films, sheets, fibers, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include, automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles.

Other useful articles and goods may be formed economically by the practice of our invention including: crates, containers, packaging, labware, such as roller bottles for culture growth and media bottles, office floor mats, instrumentation sample holders and sample windows; liquid storage containers such as bags, pouches, and bottles for storage and IV infusion of blood or solutions; packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, preferably uniform, blend will be produced prior to conversion into a finished product.

The ethylene/macromonomer copolymers can also be used as compatiblizer for polymer blends due to the heterogeneous composition on the backbone and side arms.

Processes for Making Polyethylene Copolymers

This invention relates to ethylene copolymers comprising ethylene and vinyl terminated macromonomers. Introduction of vinyl terminated macromonomers is achieved by copolymerization of ethylene and vinyl terminated macromonomers in a polymerization reactor. In a polymerization systems, a macromonomer with reactive polymerizable double bonds can be incorporated into growing polymer chains in a similar manner as the comonomer (e.g., 1-butene, 1-hexene, 1-octene) incorporation during the reaction of polymerization. Amount of macromonomer incorporation often depends on the concentration of the macromonomer relative to the concentration of ethylene or other monomers (if present). Selection of catalyst and process conditions are also useful to influence the incorporation of macromonomers. In one embodiment, this invention relates to a process comprising contact ethylene and vinyl terminated macromonomers in the presence of catalyst capable of incorporating macromonomers to produce the ethylene/macromonomer copolymers described herein.

In one embodiment, both the macromonomer and ethylene copolymer may be produced in a single polymerization process with at least two reactors in series configuration. The macromonomers may be produced in first reaction zone with a polymerization catalyst capable of producing vinyl terminated macromonomers. At least part of the contents of the first reaction zone are then transferred into a separate second reaction zone together with ethylene and optionally with additional monomers selected from $C_3$ to $C_{12}$ alpha-olefins and mixtures thereof so as to produce ethylene/macromonomer copolymers in the presence of macromonomer produced.

In one embodiment, the second reaction zone employs the same catalyst system transferred from the first reaction zone, with no additional catalyst being supplied to the second reaction zone. Alternatively, an additional amount of the same catalyst system as used in the first reaction zone is fed into the second reaction. Generally between about 10% and about 90%, such as between about 20% and about 80%, for example between about 30% and about 70% of the total catalyst is supplied to the first reaction zone, with the remainder being supplied to the second reaction zone. The molar ratio of the catalyst supplied to the first reaction zone to the catalyst supplied to the second reaction zone depends on the end-use requirements of the ethylene/macromonomer copolymer.

In another embodiment, a second catalyst capable of incorporating macromonomers is used in the second reaction zone. The second catalyst is generally different from the first catalyst system used for macromonomer production in the first reaction. The molar ratio of the first polymerization catalyst to the second polymerization catalyst is generally from 5:95 to 95:5 depending on the application and other process variables.

In a preferred embodiment, the present invention resides in a process for producing the ethylene/macromonomer copolymers described herein, the process comprising:

(i) polymerizing propylene in a first polymerization zone under conditions sufficient to produce a propylene macromonomer comprising at least 50% vinyl unsaturation based on the total unsaturated olefin chain ends; and (ii) contacting at least part of said propylene macromonomer with ethylene and optional additional monomer selected from $C_3$ to $C_{12}$ alpha-olefins in a second polymerization zone separated from said first polymerization zone under conditions sufficient to polymerize said monomer and macromonomers to produce copolymers of ethylene/macromonomer.

As described above, the contents of the first reactor zone are transferred to the second reactor zone, and become a part of the reaction medium in the second reactor zone. The catalyst system employed in the first reactor zone may still be (and preferably is) active to continue the polymerization reaction in the second reactor zone. Alternatively, a part or all of the solvent and unreacted monomers are removed from the polymerization effluent in the first reactor zone, and the polymer, and remaining solvent and monomers are transferred into the second reactor zone. This can be implemented in a system with two reactors in series and a primary separator in between the two reactors. This process scheme also allows independent control of polymerization temperature in the first and second polymerization zones.

To minimize the effects of unreacted monomer on the ethylene/macromonomer copolymer produced in the second reactor zone, the monomer conversion in the first reactor is preferably high. Preferably, the monomer conversion in the first reactor is at least 50 wt %, more preferably at least 70 wt %.

It is to be appreciated that, although the foregoing discussion refers only to first and second polymerization zones, further reaction zones could be employed, with the feed to the second reaction zone being split between the additional reaction zones.

In another embodiment, pre-made macromonomers are used to produce ethylene/macromonomer copolymers. The pre-made macromonomers are fed into a polymerization reactor in presence of ethylene and at least a catalyst capable of incorporating the macromonomers. The macromonomers can be fed into a reactor in forms of liquid, granular particles or dissolved or diluted in a carrying solvent. When the macromonomer is in the solid state at ambient condition, preferably, the macromonomers are first dissolved in a carrying solvent and fed into a reactor as macromonomer solution.

In one embodiment, the vinyl terminated macromonomers described here may be used in combination with one or more monomers having from 3 to 40 carbon atoms, preferably from $C_3$ to $C_{10}$, more preferably $C_3$ to $C_8$. Preferred monomers include propylene, 1-butene, 1-pentene, 4-methyl-1-pentene, 1-hexene, 1-octene, 1-decene, 3-methyl-1-pentene, and cyclic olefins or a combination thereof In one embodiment, the ethylene/macromonomer copolymer can be produced in an industrial scale process. Preferably the catalyst productivity is at least 20,000 kg of polymer per kg of catalyst, more preferably at least 40 kg polymer/kg catalyst, even more preferably at least 50 kg polymer/kg catalyst.

Any known polymerization process may be used to produce the ethylene copolymers. Polymerization methods include high pressure, slurry, gas, suspension, supercritical, or solution phase, or a combination thereof. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn. Polymerizations are carried out in either single reactor operation, in which ethylene, macromonomers, catalyst/activator, scavenger, and optional other copolymers are added continuously to a single reactor or in series reactor operation, in which the above components are added to each of two or more reactors connected in series.

In a preferred embodiment, this invention also relates to a process to produce the ethylene copolymer comprising contacting a catalyst, activator, ethylene, and vinyl terminated macromonomer and obtaining the ethylene copolymers, where the catalyst efficiency is 10,000 grams of polymer per gram of catalyst or more, preferably 50,000 grams of polymer per gram of catalyst or more.

Gas phase polymerization, particularly a fluidized bed process, can be used to prepare the ethylene copolymers described herein. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference). Preferably, the macromonomers are dissolved in a solvent and fed into the gas-phase reactor in a solution form.

Slurry phase polymerization, particularly a slurry loop process, can be used to prepare the ethylene copolymers described herein. A slurry polymerization process generally operates between 0.1 to 5 MPa or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed. The macromonomers can be fed as a neat liquid or dissolved/diluted in a solvent.

In one embodiment, a preferred polymerization technique useful in the invention is referred to as a particle form polymerization or a slurry process where the temperature is kept below the temperature at which the polymer goes into solution. Such technique is well known in the art, and described in for instance U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

The reactor is maintained at a pressure of 3620 kPa to 4309 kPa and at a temperature in the range of about 60° C. to about 120° C., preferably up to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the diluent and all unreacted monomer and comonomers. The resulting hydrocarbon free powder is then compounded for use in various applications.

In yet another embodiment in the slurry process useful in the invention the concentration of predominant monomer in the reactor liquid medium is in the range of from about 1 wt % to 30 wt %, preferably from about 2 wt % to about 7 wt %, more preferably from about 2.5 wt % to about 6 wt %, most preferably from about 3 wt % to about 6 wt %.

Another process useful in the invention is where the process, preferably a slurry process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT Publication No. WO 96/08520 and U.S. Pat. No. 5,712,352, which are herein fully incorporated by reference.

In another embodiment, the process is run with scavengers. Typical scavengers include trimethyl aluminum, tri-isobutyl aluminum and an excess of alumoxane or modified alumoxane.

In another embodiment, homogeneous polymerization, particularly a solution phase process, can be used to prepare the ethylene copolymers described herein. Generally this involves polymerization in a continuous reactor in which the polymer formed and the starting monomer and catalyst materials supplied are agitated to reduce or avoid concentration gradients. Suitable processes operate above the melting point of the polymers at high pressures, from 0.1 MPa to 300 MPa, in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from about 1 mm Hg to 250 MPa, preferably from 0.1 MPa to 160 MPa, most preferably from 0.1 MPa to 50 MPa.

In one embodiment 500 ppm or less of hydrogen is added to the polymerization, or 400 ppm or less, or 300 ppm or less. In other embodiments at least 50 ppm of hydrogen is added to the polymerization, or 100 ppm or more, or 150 ppm or more.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, PCT Patent Application Nos. WO 96/33227 and WO 97/22639. All documents are incorporated by reference for U.S. purposes for description of polymerization processes, metallocene selection and useful scavenging compounds.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

Suitable conditions for polymerization include a temperature from about 50° C. to about 250° C., such as from about 50° C. to about 150° C., for example from about 70° C. to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see PCT Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

A polymer can be recovered from the effluent of either the first polymerization step or the second polymerization step by separating the polymer from other constituents of the effluent using conventional separation means. For example, polymer can be recovered from either effluent by coagulation with a non-solvent, such as methanol, isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine, di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream in the polymer recovery processes. Deactivation may be effected by the mixing with suitable polar substances such as water, whose residual effect following recycle can be counteracted by suitable sieves or scavenging systems.

Suitable catalysts for producing the polyethylene copolymer are those capable of polymerizing a $C_2$ to $C_{20}$ olefin and a VTM to produce an ethylene copolymer. These include both metallocene and Ziegler-Natta catalysts. The catalysts employed in the first reaction zone should be able to produce polymers with reactive unsaturated chain ends, preferably at least 50% of vinyl unsaturation based on the total unsaturated olefin chain ends, while the catalyst used in the second reaction zone should be capable of incorporating the polymerizable macromonomer into a growing chain to form ethylene copolymers.

The macromonomers can be produced in a separated system and a separated reactor, then the macromonomers are fed into the polymerization reactor in a similar manner as those used to feed alpha-olefin comonomer. When the macromonomers with vinyl chain end are produced separately, the catalyst must be capable of incorporating the polymerizable macromonomer into a growing chain to form polyethylene copolymers. The catalysts can be in the form of a homogeneous solution, supported, or a combination thereof. In case of two catalysts are employed in the same reaction zone, preferably, at least one of the catalyst is able to incorporate more macromonomer than other catalysts so that the polymers produced will have different densities. A wide variety of transition metals compounds are known that, when activated with a suitable activator will have poor alpha-olefins incorporation and hence will produce higher density ethylene copolymers with macromonomer.

All catalysts used for olefin polymerization are useful in this invention. Generally, polymerization catalysts useful in the invention include conventional-type transition metal catalysts, metallocene catalysts and non-metallocene compounds including biphenyl phenol compounds.

Catalyst Systems

Catalysts useful to this invention include the catalysts capable of producing oligomers/polymers with reactive polymerizable chain ends and capable of incorporating oligomers/polymers with polymerizable chain ends to form branched oligomers or polymers. In a preferred embodiment, the branched oligomers/polymers can be produced using one or more activators in combination with one or more of the metallocene catalyst compounds. Most preferably metallocene catalyst compounds are those bridged (especially silyl- or germanyl-bridged) bis-cyclopentadienyl, bridged bis-indenyl, or bridged bis-tetrahydroindenyl zirconocenes or hafnocenes, most preferably those that are C1 to C6 substituted in one or two positions on each of the ring systems bound to the transition metal center.

In the description herein, the catalyst may be described as a catalyst precursor, a pre-catalyst compound, a catalyst compound, or a transition metal compound, and these terms are used interchangeably. A polymerization catalyst system is a catalyst system that can polymerize monomers to polymer. A "catalyst system" is a combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom.

In some embodiments, the metallocene may be represented by Formula I, below.

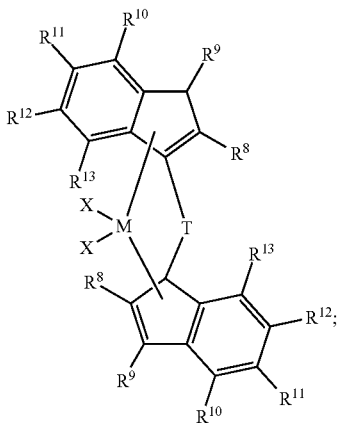

Formula I where M is hafnium or zirconium, preferably hafnium;

each X is, independently, selected from the group consisting of a substituted or unsubstituted hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system); preferably each X is independently selected from halides and $C_1$ to $C_6$ hydrocarbyl groups, preferably each X is methyl, ethyl, propyl, butyl, phenyl, benzyl, chloride, bromide, or iodide;

each $R^8$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or n-butyl; or preferably methyl;

each $R^9$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or butyl; or preferably n-propyl;

each $R^{10}$ is hydrogen;

each $R^{11}$, $R^{12}$, and $R^{13}$, is, independently, hydrogen or a substituted or unsubstituted hydrocarbyl group, a heteroatom or heteroatom containing group; preferably each $R^{11}$, $R^{12}$, and $R^{13}$, is hydrogen;

T is a bridging group represented by the formula $R_2{}^aJ$ where J is C, Si or Ge, preferably Si;

each $R^a$ is, independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two Ra can form a cyclic structure including aromatic, partially saturated or saturated cyclic or fused ring system;

further provided that any two adjacent R groups may form a fused ring or multicenter fused ring system where the rings may be aromatic, partially saturated or saturated. T may also be a bridging group as defined above for $R_2{}^aT$; and further provided that any of adjacent $R^{11}$, $R^{12}$, and $R^{13}$ groups may form a fused ring or multicenter fused ring system where the rings may be aromatic, partially saturated or saturated.

Metallocene compounds that are particularly useful in this invention include one or more of:

rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl,
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylgermanyl bis(2-methyl,3-propylindenyl)hafniumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl)hafniumdimethyl,
rac-dimethylgermanyl bis(2-methyl,3-isopropylindenyl)zirconiumdimethyl,
rac-dimethylgermanyl bis(2-methyl,3-butylindenyl)hafniumdimethyl,
rac-dimethylgermanyl bis(2-methyl,3-propylindenyl)zirconiumdimethyl,
rac-dimethylsilyl bis(2-propyl,3-methylindenyl)hafniumdimethyl,
rac-dimethylsilyl bis(2-propyl,3-methylindenyl)zirconiumdimethyl,
rac-dimethylsilyl bis(2-propyl,3-ethylindenyl)hafniumdimethyl,
rac-dimethylsilyl bis(2-propyl,3-ethylindenyl)zirconiumdimethyl,
rac-dimethylsilylbis(2-propyl,3-butylindenyl)hafniumdimethyl,
rac-dimethylsilylbis(2-propyl,3-butylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl,3-methylindenyl)hafniumdimethyl,
rac-dimethylgermanyl bis(2-propyl,3-methylindenyl)zirconiumdimethyl,
rac-dimethylgermanyl bis(2-propyl,3-ethylindenyl)hafniumdimethyl, rac-dimethylgermanyl bis(2-propyl,3-ethylindenyl)zirconiumdimethyl,
rac-dimethylgermanyl bis(2-propyl,3-butylindenyl)hafniumdimethyl,
rac-dimethylgermanyl bis(2-propyl,3-butylindenyl)zirconiumdimethyl,
rac-dimethylgermanyl bis(2-methyl,3-butylindenyl)hafniumdimethyl,
rac-dimethylgermanyl bis(2-methyl,3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the metallocene compound is rac-dimethylsilyl bis(2-methyl,3-propylindenyl)hafniumdimethyl (a), rac-dimethylsilyl bis(2-methyl,3-propylindenyl)zirconiumdimethyl (b), represented by the formulae below:

Formula II

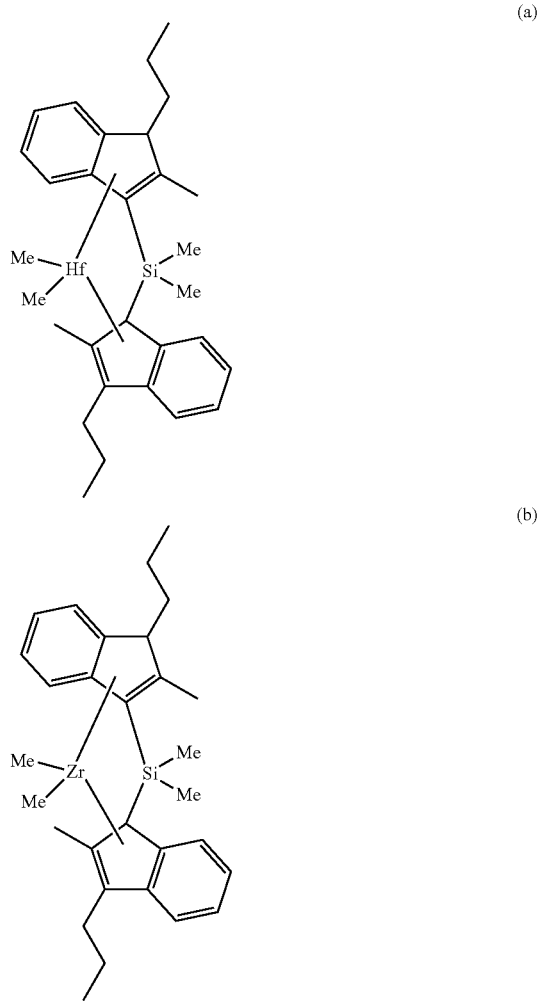

In an alternate embodiment, the "dimethyl" (Me$_2$) after the transition metal in the list of catalyst compounds above is replaced with a dihalide (such as dichloride or difluoride) or a bisphenoxide, particularly for use with an alumoxane activator.

Activator Component of Catalyst System

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O-subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1, or alternately from 1:1 to 50:1.

In an alternate embodiment, little or no alumoxane is used in the process to produce the oligomers/polymers. Preferably, alumoxane is present at zero mol %, alternately the alumoxane is present at a molar ratio of aluminum to transition metal less than 500:1, preferably less than 300:1, preferably less than 100:1, preferably less than 1:1. In an alternate embodiment, if an alumoxane is used to produce the oligomers/polymers then, the alumoxane has been treated to remove free alkyl aluminum compounds, particularly trimethyl aluminum. Further, in a preferred embodiment, the activator used herein to produce the oligomers/polymers is bulky as defined herein and is discrete.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. Preferred activators are the ionic activators.

Examples of neutral stoichiometric activators include tri-substituted boron, tellurium, aluminum, gallium and indium or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, alkenyl compounds, and mixtures thereof, preferred are alkenyl groups having 1 to 20 carbon atoms, alkyl groups having 1 to 20 carbon atoms, alkoxy groups having 1 to 20 carbon atoms, and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as ([B$(C_6F_5)_3(X)]^-$), which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines and the like. Two classes of compatible non-coordinating anions have been disclosed in EP 0 277 003 A and EP 0 277 004 A: 1) anionic coordination complexes comprising a plurality of lipophilic radicals covalently coordinated to and shielding a central charge-bearing metal or metalloid core, and 2) anions comprising a plurality of boron atoms such as carboranes, metallocarboranes and boranes.

In a preferred embodiment, the stoichiometric activators include a cation and an anion component, and may be represented by the following formula:

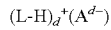

wherein L is a neutral Lewis base; H is hydrogen; $(L-H)^+$ is a Bronsted acid; $A^{d-}$ is a non-coordinating anion having the charge d−; and d is 1 2, or 3.

The cation component, (L-H)d+ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation $(L-H)_{d^+}$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene, and mixtures thereof The anion component $A^{d-}$ include those having the formula $[M^{k+}Q_n]^{d-}$ wherein k is 1, 2, or 3; n is 2, 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group, especially naphthyl. Examples of suitable $A^{d-}$ also include diboron compounds as disclosed in U.S. Pat. No. 5,447,895.

Illustrative, but not limiting examples of boron compounds which may be used as an activating cocatalyst in the preparation of the catalyst system of the processes of this invention are tri-substituted ammonium salts such as:

trimethylammonium tetrakis(perfluoronaphthyl)borate, N,N-dimethyl anilinium tetrakis(heptafluoro-2-naphthyl) borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis (perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B], (where Ph is phenyl, and Me is methyl).

Most preferably, the ionic stoichiometric activator $(L-H)_{d^+}$ $(A^{d-})$ is, N,N-dimethylanilinium tetrakis(perfluoronaphthyl) borate, N,N-dimethyl anilinium tetrakis(heptafluoro-2-naphthyl) borate, N,N-dimethylanilinium tetrakis(perfluorobiphenyl)borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetrakis(perfluorophenyl)borate.

EXAMPLES

Product Characterization

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been slowly cooled to room temperature (i.e., over a period of 10 minutes or more) and allowed to age for a sufficient time that the density is constant within +/−0.001 g/cm$^3$. The units for density are g/cm$^3$.

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stabilized at 190° C. for at least 30 minutes before inserting compression-molded sample of resin onto the parallel plates. To determine the samples viscoelastic behavior, frequency sweeps in the range from 0.01 to 385 rad/s were carried out at a temperature of 190° C. under constant strain. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials, 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4. Dynamic viscosity is also referred to as complex viscosity or dynamic shear viscosity.

The dynamic shear viscosity ($\eta^*$) versus frequency ($\omega$) curves were fitted using the Cross model (see, for example, C. W. Macosco, RHEOLOGY: PRINCIPLES, MEASUREMENTS, AND APPLICATIONS, Wiley-VCH, 1994):

$$\eta^* = \frac{\eta_0}{1 + (\lambda\omega)^{1-n}}$$

The three parameters in this model are: $\eta_0$, the zero-shear viscosity; $\eta$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1-n on a log($\eta^*$)–log($\eta$) plot. For Newtonian fluids, n=1 and the dynamic complex viscosity is independent of frequency. For the polymers of interest here, n<1, so that enhanced shear-thinning behavior is indicated by a decrease in n (increase in 1-n).

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q200 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, pp. 6812-6820, (2001), incorporated herein by reference.

Solvent for the SEC experiment was prepared by dissolving 6 grams of butylated hydroxy toluene as an antioxidant in 4 liters of Aldrich reagent grade 1,2,4-trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample. The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in $g/cm^3$, molecular weight is expressed in g/mol, and intrinsic viscosity is expressed in dL/g.

The light scattering detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0006 for propylene polymers, 0.0015 for butene polymers and 0.001 otherwise), (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 135° C. and λ=690 nm.

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta]/0.3(c[\eta])^2$$

where c is concentration and was determined from the DRI output.

The branching index ($g'_{vis}$) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'_{vis} = \frac{[\eta]_{avg}}{k M_v^\alpha}$$

The intrinsic viscosity of the linear polymer of equal molecular weight and same composition was calculated using Mark-Houwink equation. For purpose of this invention and claims thereto, α=0.695 and k=0.000579 for linear ethylene homo-polymers are used. Linear homo-polyethylene is used for $g'_{vis}$ calculation without considering the comonomer content. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and a exponents. The molecular weight data reported here for VTM are those determined using GPC DRI detector, and molecular weight data reported here for ethylene/macromonomer copolymers are those determined using GPC light scattering detector, unless otherwise noted.

Viscosity was measured using a Brookfield Viscometer according to ASTM D-3236.

Bromine number is determined by ASTM D 1159.

Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogen per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

In conducting the $^{13}C$ NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1H$ frequencies of either 400 or 700 MHz (in event of conflict, 700 MHz shall be used). The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

All molecular weights are g/mol unless otherwise noted.

Examples 1 to 5

Polyethylene copolymers in Examples 1 to 5 were made in a continuous stirred-tank reactor system with two reactors configured in series. The first reactor was a 0.5-liter and the second reactor was a 1 liter. Both of the reactors were stainless steel autoclave reactor and were equipped with a stirrer, a water cooling/steam heating element with a temperature controller, and a pressure controller. Solvents and comonomers were first purified by passing through a three-column purification system. The purification system consisted of an Oxiclear column (Model # RGP-R1-500 from Labclear) followed by a 5A and a 3A molecular sieve column. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. Ethylene was delivered as a gas solubilized in the chilled solvent/monomer mixture. The purified solvents and monomers were then chilled to about −15° C. by passing through a chiller before being fed into the reactors through a manifold. Solvent and monomers were mixed in the manifold and fed into reactor through a single tube. Catalyst and monomer contacts took place in the reactor. All liquid flow rates were measured using Brooksfield mass flow controllers.

The reactors were first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box. The collected samples were washed with xylene to remove unreacted macromonomers, then air-dried in a hood to evaporate most of the solvent followed by drying in a vacuum oven at a temperature of about 90° C. for about 12 hours. The vacuum oven dried samples were weighed to obtain yields. All the reactions were carried out at a gauge pressure of about 2.4 MPa.

Catalyst used in the production of vinyl terminated macromonomers was dimethyl silyl bis(2-methyl 3-propyl indenyl)hafnium dimethyl (catalyst A) and the activator used was N,N-dimethyl anilinium tetrakis(heptafluoro-2-naphthyl) borate. The catalyst used for the copolymerization of ethylene and vinyl terminated macromonomers was [di(p-triethylsilylphenyl) methylene] (cyclopentadienyl) (3,8-di-t-butylfluorenyl)hafnium dimethyl (Catalyst B). Catalyst B was preactivated with N,N-dimethylanilinium tetrakis(pentafluorophenyl) borate. Both the metallocene catalysts were preactivated with the activator at a molar ratio of about 1:1 in 900 ml of toluene. All catalyst solutions were kept in an inert atmosphere and fed into reactors using an ISCO syringe pump. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency.

In Examples 1 to 5, solvent, preactivated catalyst A solution, scavenger solution and propylene were fed into the first reactor to produce vinyl terminated propylene macromonomers. Then the contents of the first reactor were transferred into the second reactor. Preactivated catalyst B solution, ethylene and additional solvent were fed into the second reactor. About 10 gram of product was collected from the first reactor for characterization and calculation of yield. The final product was collected from the second reactor. The catalyst feed rate was adjusted to achieve the yield and monomer conversion. The detailed process condition and some analytical results are summarized in Table 1.

TABLE 1

|  | Example | | | | |
|---|---|---|---|---|---|
|  | 1 | 2 | 3 | 4 | 5 |
| Polymerization in Reactor #1 for macromonomer production | | | | | |
| Reactor #1 volume (ml) | 1000 | 1000 | 500 | 500 | 500 |
| Reaction temperature in reactor #1 (° C.) | 80 | 60 | 60 | 80 | 100 |
| Propylene feed rate to reactor #1 (g/min) | 5 | 5 | 5 | 5 | 5 |
| isohexane feed rate (g/min) | 16 | 16 | 15.5 | 15.5 | 15.5 |
| Catalyst A feed rate (mole/min) | 1.832E−07 | 1.832E−07 | 1.832E−07 | 1.832E−07 | 1.832E−07 |
| Yield (g/min) | | | 3.4 | 2.86 | 2.19 |
| Conversion (%) | | | 67.8% | 57.2% | 43.8% |
| vinyl chain end (%) | | | 95.2% | 96.2% | 97.1% |
| Vinylenes/1000 Carbons | | | 0 | 0 | 0 |

TABLE 1-continued

|  | Example 1 | Example 2 | Example 3 | Example 4 | Example 5 |
|---|---|---|---|---|---|
| Trisubstituted olefin/1000 Carbons |  |  | 0 | 0 | 0 |
| Vinyls/1000 Carbons |  |  | 1.5 | 1.5 | 1.5 |
| Vinylidenes/1000 Carbons |  |  | 0.05 | 0.04 | 0.03 |
| Mn ($^1$H NMR) (g/mol) |  |  | 5049 | 1404 | 613.8 |
| Polymerization in reactor #2 for production of ethylene/macromonomer copolymer | | | | | |
| Reactor #2 volume (ml) | 500 | 500 | 1000 | 1000 | 1000 |
| Reaction temperature in reactor #2 (° C.) | 90 | 130 | 130 | 130 | 130 |
| Ethylene feed rate to reactor #2 (SLPM) | 8 | 8 | 8 | 8 | 8 |
| Catalyst B feed rate (mole/min) | 5.886E−08 | 5.886E−08 | 5.886E−08 | 5.886E−08 | 5.886E−08 |
| isohexane feed rate to reactor #2 (g/min) |  |  | 52.5 | 52.5 | 52.5 |
| Yield (g/min) | 12.62 | 9.26 | 11.29 | 10.81 | 10.13 |
| Conversion (%) | 89.8% | 65.9% | 80.4% | 77.0% | 72.1% |
| Catalyst productivity (kg polymer/ kg catalyst) | 113,595 | 83,349 | 101,640 | 97,320 | 91,170 |
| Tc (° C.) | 91.16 | 69.95 | 85.82 | 69.58 | 82.06 |
| Tm (° C.) | 105.31 | 88.81 | 93.37 | 87.33 | 84.04 |
| Tg (° C.) | −29.05 | −7.43 |  |  |  |
| Heat of fusion (J/g) | 91.6 | 78.58 | 95.03 | 89.19 | 92.01 |
| Ethylene (wt %) |  |  |  |  |  |
| MI (g/10 min) |  |  | <0.1 | <0.1 | <0.1 |
| HLMI (g/10 min) |  |  | 3.2 | <1 | <1 |
| Mn_LS (g/mol) | 3,506 | 10,895 |  |  |  |
| Mw_LS (g/mol) | 179,828 | 375,227 |  |  |  |
| Mz_LS (g/mol) | 1,563,338 | 1,903,841 |  |  |  |
| $g'_{vis}$ | 0.479 | 0.668 |  |  |  |
| Complex viscosity at 0.1 rad/s (Pa · s) | 646.1 |  |  |  |  |
| Complex viscosity at 100 rad/s (Pa · s) | 33.9 |  |  |  |  |
| Density (g/cm$^3$) |  |  | 0.9024 | 0.8944 | 0.9002 |

In the above table, $g'_{vis}$ was defined as a ratio of intrinsic viscosity of the ethylene/macromonomers copolymer to the intrinsic viscosity of homo-polyethylene at the same molecular weight. Low value of $g'_{vis}$ implies incorporation of the macromonomers.

The complex viscosity of the polymer produced in Example 1 was measured at a temperature of 190° C. over an angular frequency ranging from 0.01 to 250 rad/s. Significant shear thinning was observed for the invented material. The ratio of the complex viscosity at a frequency of 0.1 rad/s to the complex viscosity at a frequency of 100 rad/s was 19.0. The shear thinning slope (STS), the slope of the log (complex viscosity) versus log (frequency) curve, for material produced in Example 1 was −0.347.

Figure 2:
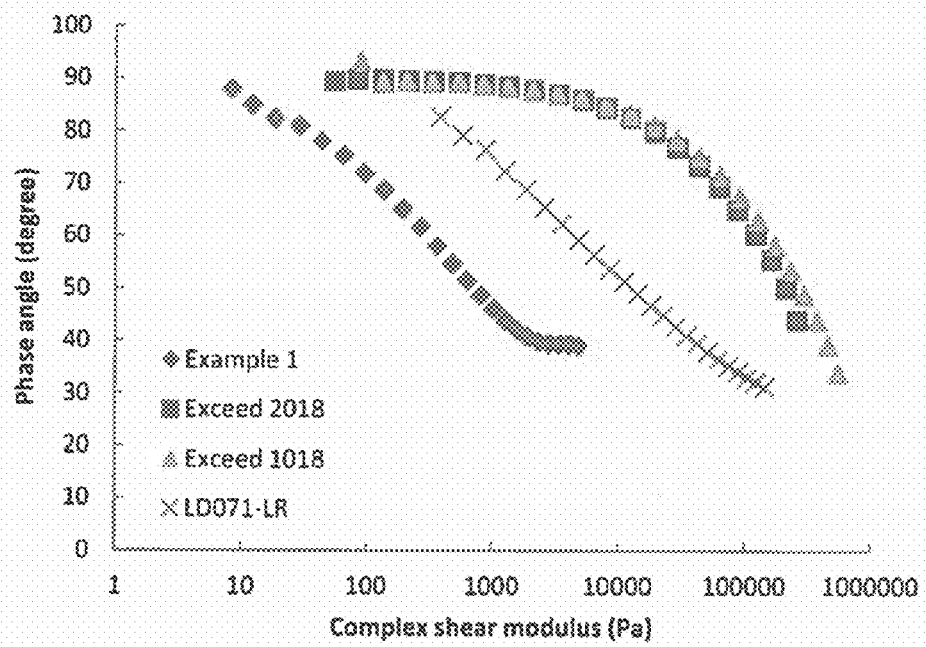
FIG. 2 is a Van Gurp-Palmen plot (phase angle vs. complex shear modulus) of the invented ethylene copolymers produced in Examples 1, Exceed™ 2018 polyethylene, Exceed™ 1018 polyethylene and LD071-LR™ low density polyethylene.

The Van Gurp-Palmen plots of the ethylene copolymer produced in Example 1 is shown in FIG. 2 in comparison with the Exceed™ Polyethylene 2018, Exceed PE 1018 and LD071-LR. Exceed™ Polyethylene 1018 ("Exceed PE 1018"), an mLLDPE available from ExxonMobil Chemical Company (Houston, Tex.), has an MI of 1.0 dg/min and a density of 0.918 g/cm$^3$. Exceed™ Polyethylene 2018 ("Exceed PE 2018"), an mLLDPE available from ExxonMobil Chemical Company (Houston, Tex.), has an MI of 2.0 dg/min and a density of 0.918 g/cm$^3$. Both Exceed 2018 and Exceed 1018 are linear polymers with short chain branching. Polyethylene LD071.LR™ is an LDPE available from ExxonMobil Chemical Company (Houston, Tex.) having an MI of 0.70 dg/min and a density of 0.924 g/cm$^3$. The phase angle of Example 1 is lower than that of LD071.LR. LD071.LR has high degree of long chain branching.

All documents described herein are incorporated by reference herein, including any priority documents and/or testing procedures to the extent they are not inconsistent with this text, provided however that any priority document not named in the initially filed application or filing documents is NOT incorporated by reference herein.

The invention claimed is:

1. A process for preparing an ethylene/macromonomer copolymer wherein the process comprises contacting ethylene and a propylene vinyl terminated macromonomer (VTM) in the presence of at least one catalyst capable of incorporating the VTM into a polyethylene backbone, wherein the catalyst is [di(p-triethylsilylphenyl) methylene] (cyclopentadienyl) (3,8-di-t-butylfluorenyl)hafnium dimethyl preactivated with N,N-dimethylanilinium tetrakis(pentafluorophenyl) borate, wherein the ethylene/macromonomer copolymer comprising at least 70 wt % of ethylene and at least one propylene vinyl terminated macromonomers (VTM) wherein the ethylene copolymer has: 1) a Mw of 100,000 g/mol or more; 2) a density of 0.94 g/cm$^3$ or less; and 3) a ratio of the complex viscosity at a frequency of 0.1 rad/s to the complex viscosity at a frequency of 100 rad/s of 15 or more; and wherein the propylene-VTM is amorphous and has no detectable melting temperature from DSC, and has an Mn (measured by $^1$H NMR) of from 200 g/mol to 5000 g/mol.

2. The process of claim 1, wherein the $T_c$ is less than 110° C.

3. The process of claim 1, wherein the ratio of the intrinsic viscosity to the intrinsic viscosity of a linear ethylene homopolymer at the same molecular weight ($g'_{vis}$) is less than 0.8.

4. The process of claim 3, wherein the $g'_{vis}$ is less than 0.7.

5. The process of claim 1, wherein the high load melt index is less than 20 dg/min.

6. The process of claim 1, wherein the melt index ratio ($I_{21}/I_2$) is from 10 to 500.

7. The process copolymer of claim 1, wherein the melt index is less than 5 dg/min.

8. The process of claim 1, wherein the process is a solution process with a homogeneous catalyst.

9. The process of claim 1, wherein the process is a slurry process.

10. A process for producing a copolymer of ethylene and propylene vinyl terminated macromonomer (VTM), the process comprising:
  (i) polymerizing propylene monomer in a first polymerization zone in the presence of at least one catalyst capable of producing a propylene VTM with at least 50% of allylic terminated chain ends relative to all unsaturated chain ends, wherein the propylene VTM is amorphous and has no detectable melting temperature from DSC, and has an Mn (measured by $^1$H NMR) of from 200 g/mol to 5000 g/mol, wherein the catalyst used in the first polymerization zone is selected from:

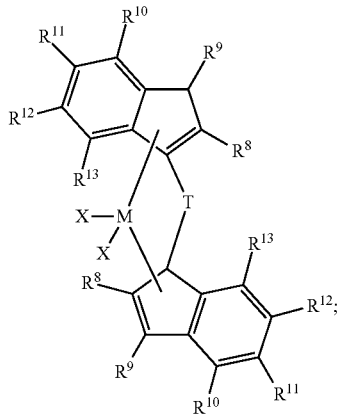

where M is hafnium or zirconium;
each X is, independently, selected from the group consisting of substituted or unsubstituted hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system);

each $R^8$ is, independently, a substituted or unsubstituted $C_1$ to $C_{10}$ alkyl group;

each $R^9$ is, independently, a substituted or unsubstituted $C_1$ to $C_{10}$ alkyl group;

each $R^{10}$ $R^{11}$, $R^{12}$, and $R^{13}$ is hydrogen;

T is a bridging group represented by the formula $R_2{}^aJ$ where J is C, Si or Ge; wherein each $R^a$ is, independently, hydrogen, halogen or a $C_1$ to $C_{20}$ hydrocarbyl, and two $R^a$ can form a cyclic structure including aromatic, partially saturated or saturated cyclic or fused ring system; and (ii) contacting at least part of the propylene VTM with ethylene and, optionally, one or more alpha-olefins in a second polymerization zone separate from said first polymerization zone in the presence of at least one catalyst capable of incorporating the propylene VTM into the copolymer.

11. The process of claim 1, the copolymer having a heat of fusion within the range of 120 J/g to 78.58 J/g.

12. The process of claim 10, wherein the copolymer has a heat of fusion within the range of 120 J/g to 78.58 J/g.

13. The process of claim 10, wherein the catalyst in the second polymerization zone is different from the catalyst in the first polymerization zone.

14. The process of claim 10, wherein the temperature in the first polymerization zone is from 60 to 80° C., and the temperature in the second polymerization zone is from 90 to 130° C.

* * * * *